United States Patent
Zhang et al.

(10) Patent No.: US 12,238,042 B2
(45) Date of Patent: Feb. 25, 2025

(54) METHOD, APPARATUS AND SYSTEM FOR DETERMINING SPATIAL RELATIONSHIP INFORMATION, AND INFORMATION ELEMENT TRANSMISSION METHOD AND APPARATUS

(71) Applicant: ZTE CORPORATION, Shenzhen (CN)

(72) Inventors: Shujuan Zhang, Shenzhen (CN); Zhaohua Lu, Shenzhen (CN); Yu Ngok Li, Hong Kong (CN); Bo Gao, Shenzhen (CN); Zhen He, Shenzhen (CN); Chuangxin Jiang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 833 days.

(21) Appl. No.: 17/422,400

(22) PCT Filed: Jan. 10, 2020

(86) PCT No.: PCT/CN2020/071306
§ 371 (c)(1),
(2) Date: Jul. 12, 2021

(87) PCT Pub. No.: WO2020/143735
PCT Pub. Date: Jul. 16, 2020

(65) Prior Publication Data
US 2022/0094510 A1    Mar. 24, 2022

(30) Foreign Application Priority Data
Jan. 10, 2019   (CN) .......................... 201910024674.8

(51) Int. Cl.
*H04L 5/00*   (2006.01)
*H04W 52/02*  (2009.01)

(52) U.S. Cl.
CPC .......... *H04L 5/0092* (2013.01); *H04L 5/0023* (2013.01); *H04L 5/0053* (2013.01); *H04W 52/0216* (2013.01)

(58) Field of Classification Search
CPC ............. H94W 52/0216; H04L 5/0092; H04L 5/0023; H04L 5/0053
(Continued)

(56) References Cited

U.S. PATENT DOCUMENTS 11,696,289 B2 *   7/2023   Cheng ................... H04W 72/21
                                                               370/329
2010/0165931 A1   7/2010   Nimbalker et al.
(Continued)

FOREIGN PATENT DOCUMENTS

CN    102474343 A   5/2012
CN    102971978 A   3/2013
(Continued)

OTHER PUBLICATIONS

R1-804974 Remaining details of beam management 3GPP TSG Meeting#92bis (Year: 2018).*
(Continued)

*Primary Examiner* — William Nealon
(74) *Attorney, Agent, or Firm* — Morgan, Lewis & Bockius LLP

(57) ABSTRACT

Disclosed are a method, apparatus and system for determining spatial relationship information, and a storage medium. The method includes: transmitting first control signaling, wherein the first control signaling is used for indicating spatial relationship information of at least one control channel resource; and determining the spatial relationship information of the at least one control channel resource according to a predetermined rule and the first control signaling.

(Continued)

Further disclosed are an information element transmission method and apparatus, and a storage medium.

14 Claims, 6 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2014/0105148 A1 | 4/2014 | Liu | |
| 2020/0053721 A1* | 2/2020 | Cheng | H04B 7/0408 |
| 2020/0119778 A1* | 4/2020 | Grant | H04L 5/0053 |
| 2020/0358577 A1* | 11/2020 | Takeda | H04L 5/0094 |
| 2021/0058932 A1* | 2/2021 | Takeda | H04B 7/088 |
| 2022/0060293 A1* | 2/2022 | Matsumura | H04L 1/1896 |

FOREIGN PATENT DOCUMENTS

| | | | |
|---|---|---|---|
| CN | 108199819 A | 6/2018 | |
| CN | 108401303 A | 8/2018 | |
| CN | 110535601 A | 12/2019 | |
| WO | WO-2019190377 A1 * | 10/2019 | ............ H04B 7/0417 |

OTHER PUBLICATIONS

International Search Report for Application No. PCT/CN2020/071306, dated Apr. 8, 2020, 4 pages including English language translation.

ZTE, "Maintenance for beam management", 3GPP TSG RAN WG1 Meeting #94, R1-1808196, Aug. 20-24, 2018, Gothenburg, Sweden, 10 pages.

Ericsson, "Remaining details of beam management", 3GPP TSG RAN WG1 Meeting #92bis, R1-1804974, Apr. 16-20, 2018, Sanya, China, 11 pages.

Extended European Search Report for Application No. 20738684.8, dated Sep. 9, 2022, 3 pages.

Huawei, "Remaining details of beam management", 3GPP TSG RAN WG1 Meeting #94, R1-1808096, Aug. 20-24, 2018, Gothenburg, Sweden, 3 pages.

Supplemental Search Report for Chinese Application No. 2019100246748, dated Nov. 18, 2022, 4 pages including translation.

Office Action for Chinese Application No. 2019100246748, dated Dec. 19, 2022, 14 pages including translation.

Australian Office Action for Application No. 2020206398, dated Jul. 4, 2022, 3 pages.

Chinese Office Action for Application No. 201910024674.8, dated Jun. 8, 2022, 12 pages including translation.

Chinese Search Report for Application No. 201910024674.8, dated May 8, 2022, 3 pages including translation.

* cited by examiner

| R1 | Serving cell ID | | | | BWPID | | |
|---|---|---|---|---|---|---|---|
| R2 | PUCCH resource ID | | | | | | |
| s7 | s6 | s5 | s4 | s3 | s2 | s1 | s0 |

1 bit

| R1 | Serving cell ID | | | | BWPID | | | |
|---|---|---|---|---|---|---|---|---|
| s7 | s6 | s5 | s4 | s3 | s2 | s1 | s0 | Old spatial relationship information |
| s7 | s6 | s5 | s4 | s3 | s2 | s1 | s0 | New spatial relationship information |

| 0 | Serving cell ID | | | | | BWPID | |
|---|---|---|---|---|---|---|---|
| R2 | PUCCH resource ID | | | | | | |
| s7 | s6 | s5 | s4 | s3 | s2 | s1 | s0 |

FIG. 4

1 bit

| 1 | Serving cell ID | | | | | BWPID | |
|---|---|---|---|---|---|---|---|
| s7 | s6 | s5 | s4 | s3 | s2 | s1 | s0 |
| s7 | s6 | s5 | s4 | s3 | s2 | s1 | s0 |

Old spatial relationship information

New spatial relationship information

FIG. 5

1 bit

| R | Serving cell ID | | | | | BWPID | |
|---|---|---|---|---|---|---|---|
| R | Relative index of the PUCCH resource in the PUCCH resource set | | | | | R | |
| s7 | s6 | s5 | s4 | s3 | s2 | s1 | s0 |

FIG. 6

| 1 bit | | | | | | | |
|---|---|---|---|---|---|---|---|
|  |  |  |  |  |  |  |  |
| R | \multicolumn{5}{c}{Serving cell ID} | \multicolumn{2}{c}{BWPID} | |
| R | \multicolumn{3}{c}{PUCCH group index} | \multicolumn{2}{c}{PUCCH set index} | \multicolumn{2}{c}{R} | |
| s7 | s6 | s5 | s4 | s3 | s2 | s1 | s0 |

FIG. 7

| 1 bit | | | | | | | |
|---|---|---|---|---|---|---|---|
|  |  |  |  |  |  |  |  |
| R | Serving cell ID | | | | | BWPID | |
| R | | | | | | PUCCH format index | |
| s7 | s6 | s5 | s4 | s3 | s2 | s1 | s0 |

FIG. 8

| 1 bit | | | | | | | |
|---|---|---|---|---|---|---|---|
|  |  |  |  |  |  |  |  |
| R | Serving cell ID | | | | | BWPID | |
| R | | | | PUCCH resource set | | PUCCH format index | |
| s7 | s6 | s5 | s4 | s3 | s2 | s1 | s0 |

FIG. 9

| | 1 bit | | | | | | |
|---|---|---|---|---|---|---|---|
| | | | | | | | |
| R | \multicolumn{4}{c}{Serving cell ID} | | | BWPID | |
| R | PUCCH group index in the PUCCH resource set | | | PUCCH resource set | | PUCCH format index | |
| s7 | s6 | s5 | s4 | s3 | s2 | s1 | s0 |

FIG. 10

| | 1 bit | | | | | | |
|---|---|---|---|---|---|---|---|
| | | | | | | | |
| R | Serving cell ID | | | | | BWPID | |
| PUCCH group index | | | PUCCH set index | | Spatial filter parameter index | | |

FIG. 11

| | 1 bit | | | | | | |
|---|---|---|---|---|---|---|---|
| | | | | | | | |
| R1 | Serving cell ID | | | | | BWPID | |
| R2 | PUCCH resource ID0 | | | | | | |
| R2 | PUCCH resource ID1 | | | | | | |
| R2 | PUCCH resource ID2 | | | | | | |
| s7 | s6 | s5 | s4 | s3 | s2 | s1 | s0 |

FIG. 12

METHOD, APPARATUS AND SYSTEM FOR DETERMINING SPATIAL RELATIONSHIP INFORMATION, AND INFORMATION ELEMENT TRANSMISSION METHOD AND APPARATUS

CROSS-REFERENCE TO RELATED APPLICATIONS

This is a National Stage Application, filed under 35 U.S.C. 371, of International Patent Application No. PCT/CN2020/071306, filed on Jan. 10, 2020, which is based on and claims priority to Chinese Patent Application No. 201910024674.8, filed with the CNIPA on Jan. 10, 2019, the disclosure of which is incorporated herein by reference in its entirety.

TECHNICAL FIELD

Embodiments of the present disclosure relate to, but are not limited to, the field of communications, and for example, to a method, apparatus and system for determining spatial relationship information, and a method and apparatus for transmitting an information element.

BACKGROUND

In a new radio access technology (NR) protocol, in order to support flexible switching of transmit beams, it is supported to configure a spatial relationship information pool through radio resource control (RRC) signaling and then select spatial relationship information in the spatial relationship information pool for each physical uplink control channel (PUCCH) resource through a medium access control (MAC)-control element (CE) command.

When a number of PUCCH resources is large, different MAC-CE commands need to be adopted for different PUCCH resources so as to activate the spatial relationship information, so that a load of the MAC-CE command is too heavy, and how to reduce the load of the MAC-CE command while guaranteeing flexible switching of sending beams is a main problem to be solved herein.

On the other hand, acknowledgement (ACK)/negative acknowledgement (NACK) feedback based on a code block group (CBG) and semi-static ACK/NACK codebook feedback are supported in NR, but there are many underutilized bit regions in the ACK/NACK feedback in the related art, resulting in unnecessary power consumption loss of a terminal.

SUMMARY

Embodiments of the present disclosure provide a method, apparatus and system for determining spatial relationship information, which can reduce a load of a MAC-CE command while guaranteeing flexible switching of sending beams.

An embodiment of the present disclosure provides a method for determining spatial relationship information. The method includes at least one of following steps: first control signaling is transmitted; where the first control signaling is used for indicating spatial relationship information of at least one control channel resource; or the spatial relationship information of the at least one control channel resource is determined or updated according to a predetermined rule and/or the first control signaling.

An embodiment of the present disclosure provides an apparatus for determining spatial relationship information. The apparatus includes at least one of a first transmission module or a spatial relationship information determination module. The first transmission module is configured to transmit first control signaling; where the first control signaling is used for indicating spatial relationship information of at least one control channel resource. The spatial relationship information determination module is configured to determine or update the spatial relationship information of the at least one control channel resource according to at least one of a predetermined rule or the first control signaling.

An embodiment of the present disclosure provides an apparatus for determining spatial relationship information. The apparatus includes a processor and a computer-readable storage medium, where the computer-readable storage medium stores instructions, and the instructions, when executed by the processor, implement any one of the methods for determining spatial relationship information described above.

An embodiment of the present disclosure provides a computer-readable storage medium. The computer-readable storage medium stores computer programs, where the computer programs, when executed by a processor, implement steps of any one of the methods for determining spatial relationship information described above.

An embodiment of the present disclosure provides a system for determining spatial relationship information. The system includes a first node and a second node. The first node is configured to perform at least one of following steps: first control signaling is sent; where the first control signaling is used for indicating spatial relationship information of at least one control channel resource; the spatial relationship information of the at least one control channel resource is determined or updated according to at least one of a predetermined rule or the first control signaling. The second node is configured to perform at least one of following steps: the first control signaling is received; and the spatial relationship information of the at least one control channel resource is determined or updated according to the predetermined rule and/or the first control signaling.

An embodiment of the present disclosure provides a method for transmitting an information element. The method includes: first-type information elements are transmitted; and a type of information carried in M bit regions in the first-type information elements is determined according to at least one of a detection condition of second-type information elements or signaling information. The type of the information includes at least one of an acknowledgement (ACK) or negative acknowledgement (NACK) obtained according to a decoding result, second information or a default value. M is a positive integer greater than or equal to 1, and each of the M bit regions includes one or more bits.

An embodiment of the present disclosure provides an apparatus for transmitting an information element. The apparatus includes a second transmission module. The second transmission module is configured to transmit first-type information elements and determine a type of information carried in M bit regions in the first-type information elements according to at least one of a detection condition of second-type information elements or signaling information. The type of the information includes at least one of an acknowledgement (ACK) or negative acknowledgement (NACK) obtained according to a decoding result, second information or a default value. M is a positive integer greater than or equal to 1, and each of the M bit regions includes one or more bits.

An embodiment of the present disclosure provides an apparatus for transmitting an information element. The apparatus includes a processor and a computer-readable storage medium, where the computer-readable storage medium stores instructions, and the instructions, when executed by the processor, implement any one of the methods for transmitting an information element described above.

An embodiment of the present disclosure provides a computer-readable storage medium. The computer-readable storage medium stores computer programs, where the computer programs, when executed by a processor, implement steps of any one of the methods for transmitting an information element described above.

An embodiment of the present disclosure includes at least one of following steps: first control signaling is transmitted; where the first control signaling is used for indicating spatial relationship information of at least one control channel resource; or the spatial relationship information of the at least one control channel resource is determined or updated according to a predetermined rule and/or the first control signaling; where the first control signaling is used for indicating the spatial relationship information of the at least one control channel resource. According to the embodiments of the present disclosure, the spatial relationship information of the at least one control channel resource is indicated through the first control signaling and/or the spatial relationship information of the at least one control channel resource is determined through the predetermined rule, so that the spatial relationship information does not need to be activated or updated by adopting the MAC-CE command for each PUCCH resource, which can reduce a load of the MAC-CE command while guaranteeing flexible switching of sending beams.

Another embodiment of the present disclosure includes: first-type information elements are transmitted; and a type of information carried in M bit regions in the first-type information elements is determined according to at least one of a detection condition of second-type information elements or signaling information. The type of the information includes at least one of an acknowledgement (ACK) or negative acknowledgement (NACK) obtained according to a decoding result, second information or a default value. M is a positive integer greater than or equal to 1, and each of the M bit regions includes one or more bits. According to the embodiments of the present disclosure, the M bit regions in the first-type information elements carry at least one of the acknowledgement (ACK) or negative acknowledgement (NACK) obtained according to the decoding result, second information or a default value, that is, the ACK or NACK obtained according to the decoding result is not carried alone, and other information is carried, so that resource waste is reduced or even avoided, and thus unnecessary power consumption loss of the terminal is reduced or even avoided.

BRIEF DESCRIPTION OF DRAWINGS

The accompanying drawings serve to provide a further understanding of technical schemes of embodiments of the present disclosure, constitute a part of the Description, serve together with the embodiments of the present disclosure to explain the technical schemes of the embodiments of the present disclosure, and do not constitute limitations to the technical schemes of the embodiments of the present disclosure.

FIG. 4 is a schematic diagram 3 of parameters included when a MAC-CE command is used for notifying spatial relationship information of a PUCCH resource in an embodiment of the present disclosure;

FIG. 5 is a schematic diagram 4 of parameters included when a MAC-CE command is used for notifying spatial relationship information of a PUCCH resource in an embodiment of the present disclosure;

FIG. 6 is a schematic diagram 5 of parameters included when a MAC-CE command is used for notifying spatial relationship information of a PUCCH resource in an embodiment of the present disclosure;

FIG. 7 is a schematic diagram 6 of parameters included when a MAC-CE command is used for notifying spatial relationship information of a PUCCH resource in an embodiment of the present disclosure;

FIG. 8 is a schematic diagram 7 of parameters included when a MAC-CE command is used for notifying spatial relationship information of a PUCCH resource in an embodiment of the present disclosure;

FIG. 9 is a schematic diagram 8 of parameters included when a MAC-CE command is used for notifying spatial relationship information of a PUCCH resource in an embodiment of the present disclosure;

FIG. 10 is a schematic diagram 9 of parameters included when a MAC-CE command is used for notifying spatial relationship information of a PUCCH resource in an embodiment of the present disclosure;

FIG. 11 is a schematic diagram 10 of parameters included when a MAC-CE command is used for notifying spatial relationship information of a PUCCH resource in an embodiment of the present disclosure;

FIG. 12 is a schematic diagram 11 of parameters included when a MAC-CE command is used for notifying spatial relationship information of a PUCCH resource in an embodiment of the present disclosure;

DETAILED DESCRIPTION

Figures 1, 2, 3:
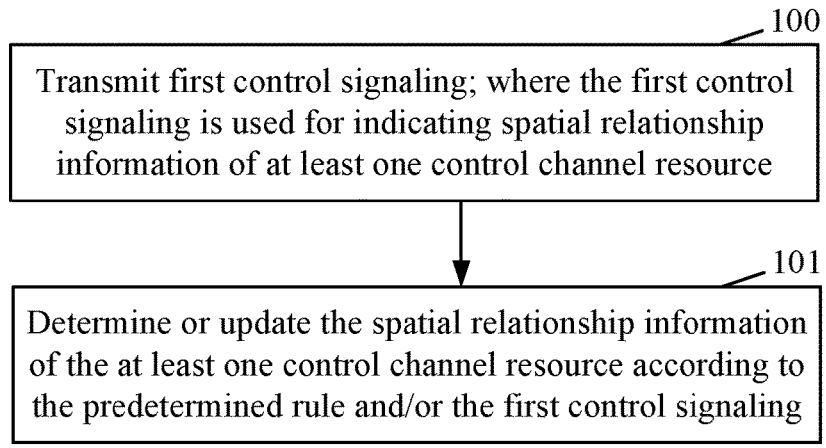
FIG. 1 is a flowchart of a method for determining spatial relationship information proposed by an embodiment of the present disclosure.
FIG. 2 is a schematic diagram 1 of parameters included when a MAC-CE command is used for notifying spatial relationship information of a PUCCH resource in an embodiment of the present disclosure.
FIG. 3 is a schematic diagram 2 of parameters included when a MAC-CE command is used for notifying spatial relationship information of a PUCCH resource in an embodiment of the present disclosure.

Embodiments of the present disclosure will now be described in detail in conjunction with the accompanying drawings hereinafter. Embodiments of and features in the embodiments of the present disclosure may be arbitrarily combined with each other without conflict.

Steps shown in the flowchart of the drawings may be executed in a computer system, such as a set of computer-executable instructions. Moreover, while a logical order is shown in the flowchart, in some cases, the steps shown or described may be performed in a different order than herein.

In following embodiments, spatial relationship information of one uplink reference signal includes one reference signal, for example, spatial relationship information of an uplink reference signal 1 includes a reference signal 2. When the reference signal 2 is an uplink reference signal, a spatial filter for sending the uplink reference signal 1 is obtained according to a spatial filter for sending the uplink reference signal 2; and when the reference signal 2 is a downlink reference signal, the spatial filter for sending the uplink reference signal 1 is obtained according to a spatial filter for receiving the downlink reference signal 2.

The step in which a spatial filter 1 is obtained according to a spatial filter 2 includes any one of the followings: the spatial filter 1 and the spatial filter 2 are the same; or an acquisition parameter of the spatial filter 1 include the spatial filter 2; for example, an angle difference between a center angle of beams obtained by the spatial filter 1 and a center angle of beams obtained by the spatial filter 2 is within a predetermined range.

The spatial relationship information may also be referred to as a spatial filtering parameter or a spatial filtering relationship parameter. For example, spatial relationship information of a demodulation reference signal (DMRS) of a PUCCH is also referred to as PUCCH-SpatialRelationInfo, or spatial Relation Info, or spatial parameter information, or other names.

The following embodiments are described based on RRC signaling of which the structure is as follows: configuration information of one uplink bandwidth part (BWP) includes one PUCCH-config, and the one PUCCH-config is configured with one or more PUCCH resources, one or more sets of PUCCH resources and one set of spatial relationship information.

In following embodiments, there are multiple PUCCH formats, and different species of uplink control information corresponding to different PUCCH formats are sent in different manners, where sending manners include at least one of the following: whether a sequence is adopted to represent control information; whether multiple time domain symbols are adopted to send same control information; whether multiple frequency domain resources are adopted to send same control information; whether a frequency hopping occurs between slots; configuration information of a demodulation reference signal; a maximum code rate; a number of the slots; a modulation manner; or whether a hybrid automatic retransmission request acknowledgement (HARQ-ACK) and Channel State Information (CSI) may be included.

For example, a PUCCH-format0, a PUCCH-format 1, a PUCCH-format 2, a PUCCH-format 3 and a PUCCH-format 4 are included in a NR.

In following embodiments, one frequency domain bandwidth includes one component carrier (CC) or one BWP.

In following embodiments, a correlation between two parameters includes at least one of: a value of one parameter is obtained according to a value of the other parameter; a value range of one parameter is obtained according to a value or a value range of the other parameter; some combination of values of the two parameters cannot occur simultaneously; configuration information of the parameter 1 is configured with a parameter 2 associated with a parameter 1; or a corresponding relation between the two parameters is determined according to signaling information and/or a predetermined rule.

In following embodiments, a transport Block (TB) is divided into one or more code blocks (CBs), each CB has its corresponding cyclic redundancy check (CRC), one TB as a whole has one CRC, each CB also has its independent CRC, and a communication receiving end may determine whether transmission information is successfully received through a CRC check bit. CBs included in one TB are divided into one or more code block groups (CBGs), each CBG has an acknowledgement (ACK)/negative acknowledgement (NACK) feedback bit corresponding to the each CBG, and if a current TB includes one CBG, whether an acknowledgement (ACK)/negative acknowledgement (NACK) feedback bit region corresponding to the CBG is filled with an ACK or a NACK is determined according to whether a decoding of the CBG is successful; for example, when the decoding of the CBG is successful, the feedback bit region is filled with the ACK, and when the decoding of the CBG is not successful, the feedback bit region is filled with NACK.

Referring to FIG. 1, an embodiment of the present disclosure proposes a method for determining spatial relationship information. The method includes at least one of following steps.

In step 100, first control signaling is transmitted; where the first control signaling is used for indicating spatial relationship information of at least one control channel resource.

In the embodiments of the present disclosure, a transmission includes a sending or a receiving. For example, a sending end sends the first control signaling, and a receiving end receives the first control signaling.

In the embodiments of the present disclosure, the control channel resource includes at least one of an uplink control channel resource or a downlink control channel resource.

In the embodiments of the present disclosure, the control channel includes at least one of an uplink control channel such as a PUCCH or a downlink control channel.

In the embodiments of the present disclosure, the first control signaling includes a MAC-CE command.

In the embodiments of the present disclosure, the first control signaling carries at least one of first information, first spatial relationship information, parameter set selection information, or at least one piece of control channel resource information.

The first information includes at least one of: second spatial relationship information, relative information of the control channel resource in a first control channel resource set, format information of the control channel resource, first control channel resource set information, information of a control channel resource group, time domain characteristics of the control channel resource, channel state information (CSI)-report configuration information corresponding to the control channel resource, or a frequency domain bandwidth index.

In the embodiments of the present disclosure, the method includes at least one of: the first spatial relationship information includes index information of the first spatial relationship information;
the control channel resource information includes index information of the control channel resource;
the second spatial relationship information includes index information of the second spatial relationship information;
the relative information of the control channel resource in the control channel resource set includes index information of the control channel resource in the control channel resource set; the control channel resource set information includes index information of the control channel resource set;
the information of the control channel resource group includes index information of the control channel resource group;
the time domain characteristics of the control channel resource include at least one of periodic, aperiodic or semi-persistent; or
the CSI-report configuration information corresponding to the control channel resource includes a CSI-Report setting index corresponding to the control channel resource.

In the embodiments of the present disclosure, in the first control signaling, a number of bits occupied by a notification region of the first spatial relationship information or the second spatial relationship information is P or $\lceil \log_2 P \rceil$; where P is a number of spatial relationship information elements included in a spatial relationship information set.

In the embodiments of the present disclosure, the control channel resource group satisfies at least one of following characteristics:
the control channel resource group is acquired by grouping control channel resources in the first control channel resource set according to second control signaling and/or a predetermined rule; where the first control channel resource set includes at least one of a predetermined control channel resource list or a control channel resource set where control channel resources are located;
the number N of control channel resource groups is associated with the number M of spatial relationship information elements included in a spatial relationship information set; or the control channel resource group is acquired by grouping the control channel resources in the first control channel resource set according to the first information.

The second control signaling includes at least one of following signaling: RRC signaling, MAC-CE, or physical layer control signaling.

In an embodiment, for example, control channel resources included in the control channel resource group are notified to the terminal in the second control signaling, or the first information is notified to the terminal in the second control signaling, and the control channel resources with the same first information form one control channel resource group, and other grouping manners are not excluded, and/or the control channel resource groups is acquired according to the predetermined rule. For example, the control channel resource group is acquired by grouping the control channel resources into N control channel resource groups. Each group includes a same number of PUCCH resources, and when a uniform grouping is not possible, a predetermined processing is performed, for example, in the manners described in an embodiment 1.

In the embodiments of the present disclosure, the method includes at least one of: the parameter set selection information being used for indicating a parameter set included in the first control signaling; or the parameter set selection information being associated with at least one of following information: whether a special control channel resource is configured or not, whether the spatial relationship information of the control channel resource is configured or not, or whether a radio resource control (RRC) link state is entered or not.

For example, before a special uplink control channel resource is not configured, a value of the parameter set selection information is a fixed value, and after the special uplink control channel resource is configured, a value range of the parameter set selection information may be larger. Alternatively, before the special uplink control channel resource is not configured, the control signaling does not carry the parameter set selection information, and after the special uplink control channel resource is configured, the control signaling carries the parameter set selection information.

In step 101, the spatial relationship information of the at least one control channel resource is determined or updated according to the predetermined rule and/or the first control signaling.

In the embodiments of the present disclosure, the step in which the spatial relationship information of the at least one control channel resource is determined or updated includes at least one of:
spatial relationship information of at least one control channel resource corresponding to the first information is determined or updated as the first spatial relationship information; or
spatial relationship information of a control channel resource corresponding to the at least one piece of control channel resource information is determined or updated as the first spatial relationship information.

The at least one control channel resource corresponding to the first information includes at least one of:
at least one control channel resource which has same first information; or
at least one control channel resource in a first control channel resource set corresponding to the first information.

In the embodiments of the present disclosure, the first control channel resource set includes at least one of:
a control channel resource in P frequency domain bandwidths; where P is a positive integer greater than or equal to 1;
a control channel resource with a same time domain characteristic; where the time domain characteristics include at least one of aperiodic, periodic or semi-persistent;
control information which is included in a control channel resource and includes at least one of acknowledgement character (ACK) information or negative acknowledgement character (NACK) information, or channel state information (CSI);

a candidate control channel resource set for feeding back the ACK information or the NACK information; where when the ACK information or the NACK information is fed back, one control channel resource is selected from the candidate control channel resource set;

P second control channel resource sets in the P frequency domain bandwidths; where in a case where P is greater than 1, different control channel resources in the P second control channel resource sets are located in different frequency domain bandwidths; or all second control channel resource sets in the P frequency domain bandwidths;

where P is a positive integer greater than or equal to 1.

The second control channel resource sets satisfy at least one of following characteristics:

one of the second control channel resource sets is associated with one control information load range;

an intersection among control information load ranges associated with different second control channel resource sets in one frequency domain bandwidth is empty; or time domain characteristics of control channel resources in one of the second control channel resource sets are the same.

In the embodiments of the present disclosure, the step in which the spatial relationship information of the at least one control channel resource is determined or updated includes at least one of:

spatial relationship information of a first control channel resource is determined according to spatial relationship information of a second control channel resource; first information of the first control channel resource is identical to first information of the second control channel resource. For example, the spatial relationship information of the first control channel resource is determined to be the spatial relationship information of the second control channel resource; or the spatial relationship information of the first control channel resource is determined to include the spatial relationship information of the second control channel resource; or, the spatial relationship information of the first control channel resource is determined according to other manners; and a specific determination manner is not used for limiting the protection scope of the embodiments of the present disclosure;

in a case where spatial relationship information of a second control channel resource is updated, spatial relationship information of a first control channel resource is determined according to the updated spatial relationship information of the second control channel resource;

spatial relationship information of a third control channel resource is determined or updated according to spatial relationship information of a fourth control channel resource in a third control channel resource set, where the third control channel resource is not configured with the spatial relationship information or the spatial relationship information of the third control channel resource is not updated, and the fourth control channel resource is configured with the spatial relationship information or the spatial relationship information of the fourth control channel resource is updated. For example, the spatial relationship information of the third control channel resource is determined to be the spatial relationship information of the fourth control channel resource in the third control channel resource set, where the third control channel resource is not configured with the spatial relationship information, and the fourth control channel resource is configured with the spatial relationship information or the spatial relationship information of the fourth control channel resource is updated; or the spatial relationship information of the third control channel resource is determined to include the spatial relationship information of the fourth control channel resource in the third control channel resource set, where the third control channel resource is not configured with the spatial relationship information, and the fourth control channel resource is configured with the spatial relationship information or the spatial relationship information of the fourth control channel resource is updated; or the spatial relationship information of the third control channel resource is determined according to other determination manners; and a specific determination manner is not used for limiting the protection scope of the embodiments of the present disclosure; or first information is included in an acquisition parameter of the spatial relationship information of the control channel resource.

The second control channel resource satisfies at least one of following characteristics: the second control channel resource is a control channel resource satisfying a predetermined characteristic among control channel resources which have same first information;

the second control channel resource is a control channel resource satisfying the predetermined characteristic among control channel resources which have same first information and of which spatial relationship information updating signaling has latest start time; or first information of the second control channel resource is identical to first information of the first control channel resource.

Characteristics of the fourth control channel resource include at least one of:

the fourth control channel resource includes a control channel resource with a control channel resource index satisfying a predetermined characteristic in the third control channel resource set;

the fourth control channel resource includes a control channel resource with a control channel resource index satisfying a predetermined characteristic in a fourth control channel resource set, where the fourth control channel resource set includes a control channel resource which has same first information as the third control channel resource in the third control channel resource set; or first information of the fourth control channel resource is identical to first information of the third control channel resource.

Control channel resources satisfying specific characteristics include a control channel resource with a lowest or highest control channel resource index.

The control information includes at least one of uplink control information or downlink control information;

The uplink control information includes an ACK/NACK, a CSI, or a schedule request (SR); and the downlink control information includes downlink control information (DCI).

According to the embodiments of the present disclosure, the spatial relationship information of the at least one control channel resource is indicated through the first control signaling and/or the spatial relationship information of the at least one control channel resource is determined according to the predetermined rule, so that the spatial relationship information does not need to be activated or updated by adopting the MAC-CE command for each PUCCH resource, which can reduce a load of the MAC-CE command while guaranteeing flexible switching of sending beams.

Several specific embodiments are listed below to illustrate the implementation of the methods described above, and the listed embodiments are not intended to limit the protection scope of the methods described above, but are merely examples listed for the sake of illustration.

Embodiment 1

In this embodiment, the spatial relationship information is activated for at least one PUCCH resource by the first control signaling and/or an agreed rule.

Specifically, a spatial relationship information set is configured in a PUCCH-config of a BWP through the RRC signaling, for example, the spatial relationship information set includes 8 pieces of spatial relationship information, and one piece of spatial relationship information in the above spatial relationship information set is activated for each PUCCH resource through the MAC-CE command, and the spatial relationship information of the PUCCH resource is activated spatial relationship information. The MAC-CE command may be adopted to activate another spatial relationship information for this PUCCH resource if sending beams of this PUCCH resource is to be changed after a period of time, which can reduce a load of the MAC-CE command while guaranteeing flexible switching of sending beams of the PUCCH. The spatial relationship information of the PUCCH may be activated in at least one of following manners. Manner one: old spatial relationship information (namely, the second spatial relationship information described above) and new spatial relationship information (namely, the first spatial relationship information described above) are notified in the MAC-CE command, and after a terminal receives the MAC-CE command, spatial relationship information of the PUCCH resource of which the previous spatial relationship information is the old spatial relationship information is updated to the new spatial relationship information. Specifically, for example, 64 PUCCH resources are included in one PUCCH-config, 8 pieces of spatial relationship information are included in the PUCCH-config, and before time t1, spatial relationship information activated for PUCCH resources 0~10 by the MAC-CE command (for example, one piece of spatial relationship information is activated for each PUCCH resource by the MAC-CE command shown in FIG. 2) is spatial relationship information 3, spatial relationship information activated for PUCCH resources 11~64 by the MAC-CE command is spatial relationship information 8, it is notified that spatial relationship information 3 (i.e. the old spatial relationship information in FIG. 3) is updated to spatial relationship information 4 (i.e. the new spatial relationship information in FIG. 3) is notified through the MAC-CE command (e.g. through the MAC-CE command shown in FIG. 3) at time t1, then spatial relationship information of PUCCH resources 0~10 are all updated to spatial relationship information 4. In FIG. 2 and FIG. 3, si, i=0, 1, 2, . . . 7, which in turn corresponds to 8 pieces of spatial relationship information pucch-SpatialRelationInfo Identity (ID) included in the PUCCH-config, and only one of si,i=0, 1, . . . , 7 in FIG. 2 has a value of 1, i.e., the spatial relationship information of the PUCCH resource is spatial relationship information corresponding to si with a value of 1. In FIG. 3, only one si value is 1 for both the old spatial relationship information and the new spatial relationship information. Each row in FIGS. 2 and 3 represents 8 bits, and Ri,i=1, 2 indicates that the bit region is reserved. Two different MAC-CE commands are shown in FIGS. 2 and 3, when one MAC-CE command is used, R1 in FIGS. 2 and 3 may also be used for representing whether the bit region in the MAC-CE command is used for explaining whether the MAC-CE command is shown in FIG. 2 or FIG. 3, namely the R1 bit region is not used as a reserved region any more but is used as a MAC-CE command selection region, when the bit region is a first predetermined value (such as 0), bits in the MAC-CE command are shown in FIG. 4 according to the interpretation of FIG. 2, and when the bit region is shown in FIG. 4, the bit region is not used as a MAC-CE command selection region. and when the bit region is a second predetermined value (such as 1), bits in the MAC-CE command are explained using FIG. 3, as shown in FIG. 5, and the selection region may be referred to as a parameter set selection region, namely used for indicating parameter set selection information carried by the MAC-CE command, or may be referred to as a spatial relationship information notification manner selection region, or other equivalent names, which has no influence on the creativity of the text.

Manner two: following information is notified in the MAC-CE command: a relative index of the PUCCH resource in the PUCCH resource set (namely the second control channel resource set) and an index of the activated spatial relationship information in the spatial relationship information set described above, all PUCCH resources with the PUCCH resource index in all PUCCH resource sets (all PUCCH resource sets form the first control channel resource set) in the PUCCH-config are updated to the spatial relationship information notified in the MAC-CE command, for example, the PUCCH-config includes 4 PUCCH resource sets, as shown in a table 1, for example, a MAC-CE notification manner as shown in FIG. 6 is adopted, and when the relative index is notified to be 1 in the MAC-CE, in si,i=0, 1, 2, . . . , 7, only s5 is set to 1, and the spatial relationship information of the 4 PUCCH resources in a 2-nd column (i.e., a column with the relative index of 1) in the table 1 is updated to spatial relationship information represented by the s5, i.e., the 6-th spatial relationship information in the spatial relationship information set (the spatial relationship information index starts from 0).

TABLE 1

| PUCCH resource set | relative index of PUCCH resource in the set | | | | | |
|---|---|---|---|---|---|---|
| | 0 | 1 | 2 | 3 | 4 | 5 |
| set 1 | PUCCH resource 3 | PUCCH resource 4 | PUCCH resource 5 | PUCCH resource 7 | PUCCH resource 22 | PUCCH resource 32 |
| set 2 | PUCCH resource 4 | PUCCH resource 10 | PUCCH resource 28 | | | |
| set 3 | PUCCH resource 5 | PUCCH resource 6 | PUCCH resource 0 | PUCCH resource 50 | | |
| set 4 | PUCCH resource 6 | PUCCH resource 4 | PUCCH resource 10 | PUCCH resource 12 | PUCCH resource 11 | |

Manner 3: PUCCH resources in a PUCCH set are divided into N groups, optionally the N value is determined according to the number M of spatial relationship information elements included in the spatial relationship information set, e.g., N is an integer multiple of M, in an embodiment, e.g., N is equal to M. The MAC-CE command includes following information: a PUCCH resource set index, a PUCCH group index in the PUCCH resource set, spatial relationship information index, as shown in FIG. 7. The grouping of the PUCCH resources in a PUCCH resource set may be performed according to the predetermined rule, for example, may be uniformly divided into N groups, each group includes a same number of PUCCH resources, and when the grouping cannot be performed uniformly, the predetermined processing is performed, for example, there are Z PUCCH resources in a set, each group of a previous number z1=mod (Z,N) of groups includes a number $\lfloor z/N \rfloor$ of PUCCH resource, for example, the previous $\lfloor z/N \rfloor$ PUCCH resources in the PUCCH resource set belong to a PUCCH group 0, $\lceil Z/N \rceil\_2\lceil Z/N \rceil-1$ PUCCH resources in the PUCCH resource set belongs to a PUCCH group 1, and so on, each group of the rest (Z-Z1) groups includes $\lfloor Z/N \rfloor$ PUCCH resources. The PUCCH resource set index is carried in the MAC-CE command, or the PUCCH resource set index is not carried, and only the PUCCH resource group index is carried, so that spatial relationship information of all PUCCH resources corresponding to the PUCCH resource group index in all PUCH resource sets in the PUCCH-config is updated to the spatial relationship information notified in the MAC-CE command.

Manner four: following information is notified in the MAC-CE command: PUCCH format index information (namely format information of the uplink control channel resource described above) and spatial relationship information (namely the first spatial relationship information described above), and the spatial relationship information of all PUCCH resources which have a same PUCCH format and correspond to the PUCCH format index in the PUCCH-config is updated to the spatial relationship information notified in the MAC-CE command.

Manner five: following information is notified in the MAC-CE command: PUCCH format index information, spatial relationship information and a set index of PUCCH resources. Specifically, PUCCH resources with a same PUCCH format in a PUCCH resource set are divided into groups, so that the MAC-CE command may update spatial relationship information of PUCCH resources in one group at a time.

In an embodiment, since only one spatial relationship information needs to be activated for one PUCCH resource or multiple PUCCH resources, in FIG. 2~FIG. 10, the spatial relationship information is notified in a bitmap manner, which is wasteful of the MAC-CE command, for example, 8 spatial relationship information are included in the spatial relationship information set in PUCCH-config, 8 bits are needed to notify the spatial relationship information. Therefore, a manner of only notifying the spatial relationship information index may be adopted, so that one piece of spatial relationship information only needs 3 bits, namely, the spatial relationship information elements included in the spatial relationship information set are P elements, the bitmap manner needs P bits, and an index manner only needs $\lceil \log_2 P \rceil$ bits. A notification manner of si,i=0, 1, ... 7 in FIG. 7 is changed into the index manner and changed into the manner of FIG. 11, and after the index information of the spatial relationship information is notified, a number of notification bits of a whole MAC-CE command may be reduced by 8 bits by utilizing the reserved region bits in FIG. 7.

In an embodiment, the MAC-CE command may carry time domain characteristics of the uplink control channel, and the time domain characteristics include periodic characteristics, semi-persistent characteristics and non-periodic characteristics, so that spatial relationship information of the uplink control channel resource in an uplink control channel resource list corresponding to the time domain characteristics notified in the MAC-CE command is updated.

In an embodiment, the MAC-CE command may carry a CSI reporting index corresponding to the uplink control channel, and the CSI reporting index may be a CSI-Reportsettig index, so that spatial relationship information of the uplink control channel resource in an uplink control channel resource list corresponding to the CSI-Reportsettig index notified in the MAC-CE command is updated.

In the above manners, at least one of the first information is notified in the MAC-CE command: old spatial relationship information, relative index information of the PUCCH resource in the PUCCH resource set, PUCCH format index information, PUCCH resource set index, or PUCCH group index in the PUCCH resource set. Spatial relationship information of one or more PUCCH resources having same first information is updated to spatial transmission filtering parameters activated in the MAC-CE command, time domain characteristics of the PUCCH resources and CSI-Report setting indexes corresponding to the PUCCH resources.

In an embodiment, the MAC-CE command may also carry the parameter set selection region (i.e., the parameter set selection information), i.e., to indicate the parameter set selection information carried by the MAC-CE command, for example the first information carried by the MAC-CE command is which one of the first information described above, the parameter set selection information may also be referred to as a spatial relationship information notification manner selection region, or other equivalent name, which has no influence on the creativity of the text.

In an embodiment, there is an association between the parameter set selection information and at least one of: whether a special uplink control channel resource is configured or not, whether the spatial relationship information of the uplink control channel resource is configured or not, or whether a RRC link state is entered or not. Specifically, before the spatial relationship information is not configured for each uplink control channel resource through the RRC signaling, the spatial relationship information of the PUCCH resource may only be notified in the manner described in FIG. 2, and after the spatial relationship information is configured for each uplink control channel resource through the RRC signaling, the spatial relationship information of the PUCCH resource may be notified in the manner of notifying the first information described above, that is, before the spatial relationship information is not configured for each uplink control channel resource through the RRC signaling, the parameter set selection information may only select the parameter set described in FIG. 2.

In an embodiment, the spatial relationship information of the uplink control channel resource having same first information in a predetermined PUCCH list is updated to the spatial relationship information notified in the MAC-CE command.

The predetermined PUCCH list (i.e. the first control channel resource set) includes one of:
all uplink control channel resources configured in one frequency domain bandwidth, such as all PUCCH resources configured in one CC or all PUCCH resources configured in one BWP;
all aperiodic PUCCH resources configured in one frequency domain bandwidth, where aperiodic uplink control information (UCI) is carried in the aperiodic PUCCH resources, and the UCI includes channel state information (CSI) and/or HARQ-ACK;
all periodic PUCCH configured in one frequency domain bandwidth;
all semi-persistent PUCCH configured in one frequency domain bandwidth;
all PUCCH resources carrying the HARQ-ACK in the UCI configured in one frequency domain bandwidth;

the control information included in the control channel resource includes channel state information (CSI);
the predetermined control channel resource list includes a candidate control channel resource set for feeding back the ACK information or the NACK information;
the predetermined control channel resource list includes all second control channel resource sets in one frequency domain bandwidth; or
the predetermined control channel resource list only includes one second control channel resource set in one frequency domain bandwidth.

In the above embodiments, one uplink second control channel resource set is associated with one UCI load range, the intersection of the UCI load ranges associated with different uplink second control channel resource sets is empty, such as one set among set 1-set 4 in the table 1, one set is selected from multiple sets according to a UCI load carrying the ACK/NACK, and one uplink control channel resource is selected from one set according to set signaling information or the predetermined rule, so as to send the UCI.

Embodiment 2

In this embodiment, one piece of spatial relationship information and one or more PUCCH resource indexes are notified in one MAC-CE command, such that the spatial relationship information of the one or more PUCCH resources is updated to spatial relationship information notified in the MAC-CE command, as shown in FIG. 12, one MAC-CE command includes 3 PUCCH resource indexes, and the spatial relationship information of the 3 PUCCH resources is updated to the spatial relationship information notified in the MAC-CE command.

Embodiment 3

In this embodiment, an acquisition parameter of the spatial relationship information of the uplink control channel resource includes at least one of: first information, index information of the uplink control channel resource, or a predetermined rule.

The first information includes at least one of following information: old spatial relationship information (namely, the second spatial relationship information described above), relative index information of the uplink control channel resource in an uplink control channel resource set (namely, the second control channel resource set described above), uplink control channel resource format information, index information of the uplink control channel resource set, index information of an uplink control channel resource group, time domain characteristics of the PUCCH resource, and a CSI-Report setting index corresponding to the PUCCH resource.

In an embodiment, spatial relationship information of an uplink control channel resource 1 is obtained according to spatial relationship information of an uplink control channel resource 2, and first information of the uplink control channel resource 1 is identical to first information of the uplink control channel resource 2.

In an embodiment, the uplink control channel resource 2 is an uplink control channel resource in which an uplink control channel resource index satisfies a predetermined characteristic in an uplink control channel resource set with the same first information in a predetermined uplink control channel list (i.e., the first control channel resource set). For example, in a manner shown in FIG. 2, the spatial relationship information of the uplink control channel resource 2 is updated/activated through the MAC-CE command, the spatial relationship information of the uplink control channel resource 1 does not have corresponding MAC-CE command notification, the first information of the uplink control channel resource 1 is identical to the first information of the uplink control channel resource 2, if yes, the spatial relationship information of the uplink control channel resource 1 is updated to the spatial relationship information of the uplink control channel resource 2; or the uplink control channel resource 2 is an uplink control channel resource in which the uplink control channel resource index satisfies the predetermined characteristic in the uplink control channel resource set, which has same first information and of which spatial relationship information updating signaling has latest start time, among the predetermined uplink control channel list.

In an embodiment, when one uplink control channel resource is not configured with the spatial relationship information, it is acquired according to the spatial relationship information of the uplink control channel resources of which the index information of the uplink control channel resource in the predetermined uplink control channel list satisfies the predetermined characteristic.

In an embodiment, one or more uplink control channel resources are updated to one piece of spatial relationship information according to the predetermined rule, for example, the spatial relationship information of the uplink control channel resource 1 is notified in the manner shown in FIG. 2; if yes, uplink control channel resources which have same first information of the uplink control channel resource 1 in the predetermined uplink control channel list are updated to the spatial relationship information of the uplink control channel resource 1; or the spatial relationship information of the uplink control channel resource which is not configured with the spatial relationship information in one BWP is updated to current latest notified spatial relationship information.

A predetermined PUCCH resource list (i.e. the predetermined uplink control channel resource list described above, i.e. the first control channel resource set) includes one of: all uplink control channel resources configured in one frequency domain bandwidth, such as all PUCCH resources configured in one CC or all PUCCH resources configured in one BWP; all aperiodic PUCCHs configured in one frequency domain bandwidth, where aperiodic UCI is carried in the aperiodic PUCCHs, and the UCI includes CSI and/or HARQ-ACK;
all periodic PUCCH configured in one frequency domain bandwidth;
all semi-persistent PUCCH configured in one frequency domain bandwidth;
all PUCCH resources carrying the HARQ-ACK in the UCI configured in one frequency domain bandwidth;
the control information included in the control channel resource includes channel state information (CSI);
the predetermined control channel resource list includes a candidate control channel resource set for feeding back the ACK information or the NACK information;
the predetermined control channel resource list includes all second control channel resource sets in one frequency domain bandwidth;
the predetermined control channel resource list only includes one second control channel resource set in one frequency domain bandwidth.
the predetermined control channel resource list includes all second control channel resource sets in all frequency domain bandwidths; or the predetermined control channel resource list only includes a second control channel resource set with the same second control channel resource set index in all frequency domain bandwidths.

In the above embodiments, one uplink second control channel resource set is associated with one UCI load range, the intersection of the UCI load ranges associated with different uplink second control channel resource sets is empty, such as one set among set 1-set 4 in the table 1, one set is selected from multiple sets according to a UCI load carrying the ACK/NACK, and one uplink control channel resource is selected from one set according to set signaling information or the predetermined rule, so as to send the UCI.

A difference between this embodiment and the embodiment 1 is that the MAC-CE command does not carry the first information, and after spatial relationship information of one uplink control channel resource is updated, spatial relationship information of all uplink control channel resources which have same first information of the uplink control channel resource is updated.

Figure 13:
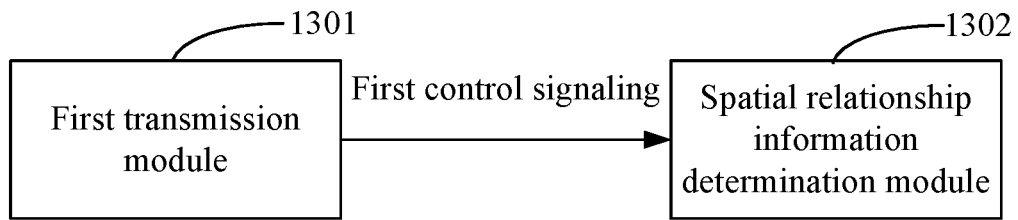
FIG. 13 is a schematic diagram of a structural composition of an apparatus for determining spatial relationship information proposed by an embodiment of the present disclosure.

Referring to FIG. 13, another embodiment of the present disclosure proposes an apparatus for determining spatial relationship information. The apparatus includes a first transmitting module 1301 and a spatial relationship information determination module 1302. The first transmitting module 1301 is configured to transmit first control signaling; where the first control signaling is used for indicating spatial relationship information of at least one control channel resource. The spatial relationship information determination module 1302 is configured to determine or update the spatial relationship information of the at least one control channel resource according to at least one of a predetermined rule or the first control signaling.

In the embodiments of the present disclosure, a transmission includes a sending or a receiving. For example, a sending end sends the first control signaling, and a receiving end receives the first control signaling.

In the embodiments of the present disclosure, the control channel resource includes at least one of an uplink control channel resource or a downlink control channel resource.

In the embodiments of the present disclosure, the control channel includes at least one of an uplink control channel such as a PUCCH or a downlink control channel.

In the embodiments of the present disclosure, the first control signaling includes a MAC-CE command.

In the embodiments of the present disclosure, the first control signaling carries at least one of first information, first spatial relationship information, parameter set selection information, or at least one piece of control channel resource information.

The first information includes at least one of: second spatial relationship information, relative information of the control channel resource in a first control channel resource set, format information of the control channel resource, first control channel resource set information, information of a control channel resource group, time domain characteristics of the control channel resource, or channel state information (CSI)-report configuration information corresponding to the control channel resource.

In the embodiments of the present disclosure, the method includes at least one of: the first spatial relationship information includes index information of the first spatial relationship information;
the control channel resource information includes index information of the control channel resource;
the second spatial relationship information includes index information of the second spatial relationship information;
the relative information of the control channel resource in the control channel resource set includes index information of the control channel resource in the control channel resource set; the control channel resource set information includes index information of the control channel resource set;
the information of the control channel resource group includes index information of the control channel resource group;
the time domain characteristics of the control channel resource include at least one of periodic, aperiodic or semi-persistent; or
the CSI-report configuration information corresponding to the control channel resource includes a CSI-Report setting index corresponding to the control channel resource.

In the embodiments of the present disclosure, in the first control signaling, a number of bits occupied by a notification region of index information of the first spatial relationship information or a notification region of index information of the second spatial relationship information is P or $\lceil \log_2 P \rceil$; where P is a number of spatial relationship information elements included in a spatial relationship information set.

In the embodiments of the present disclosure, the control channel resource group satisfies at least one of following characteristics:
the control channel resource group is acquired by grouping control channel resources in the first control channel resource set according to second control signaling and/or a predetermined rule; where the first control channel resource set includes at least one of a predetermined control channel resource list or a control channel resource set where control channel resources are located;
a number N of control channel resource groups is associated with a number M of spatial relationship information elements included in a spatial relationship information set; or
the control channel resource group is acquired by grouping the control channel resources in the first control channel resource set according to the first information.

The second control signaling includes at least one of following signaling: RRC signaling, MAC-CE, or physical layer control signaling.

Specifically, for example, control channel resources included in the control channel resource group are notified in the second control signaling, or the first information is notified in the second control signaling, and one group in which the first information is the same is formed, and other grouping manners are not excluded, and/or it may be divided into N groups uniformly according to the predetermined rules, for example. Each group includes a same number of PUCCH resources, and when a uniform grouping is not possible, a predetermined processing is performed, for example, in the manners described in an embodiment 1.

In the embodiments of the present disclosure, the method includes at least one of: the parameter set selection information being used for indicating a parameter set included in the first control signaling; or
the parameter set selection information being associated with at least one of following information: whether a special control channel resource is configured or not, whether the spatial relationship information of the control channel resource is configured or not, or whether a radio resource control (RRC) link state is entered or not.

For example, before a special uplink control channel resource is not configured, a value of the parameter set selection information is a fixed value, and after the special uplink control channel resource is configured, a value range of the parameter set selection information may be larger, or before the special uplink control channel resource is not configured, the control signaling does not carry the parameter set selection information, and after the special uplink control channel resource is configured, the control signaling carries the parameter set selection information.

In the embodiments of the present disclosure, the spatial relationship information determination module 1302 is configured to determine or update the spatial relationship information of the at least one control channel resource in at least one of following manners: spatial relationship information of at least one control channel resource corresponding to the first information is determined or updated as the first spatial relationship information; or spatial relationship information of a control channel resource corresponding to the at least one piece of control channel resource information is determined or updated as the first spatial relationship information.

The at least one control channel resource corresponding to the first information includes at least one of:
at least one control channel resource which has same first information; or
at least one control channel resource in a first control channel resource set corresponding to the first information.

In the embodiments of the present disclosure, the first control channel resource set includes at least one of:
a control channel resource in P frequency domain bandwidths; where P is a positive integer greater than or equal to 1;
a control channel resource with a same time domain characteristic; where the time domain characteristics include at least one of aperiodic, periodic or semi-persistent;
control information which is included in a control channel resource and includes at least one of acknowledgement character (ACK) information or negative acknowledgement character (NACK) information, or channel state information (CSI);
a candidate control channel resource set for feeding back the ACK information or the NACK information; where when the ACK information or the NACK information is fed back, one control channel resource is selected from the candidate control channel resource set;
P second control channel resource sets in the P frequency domain bandwidths; where in a case where P is greater than 1, different control channel resources in the P second control channel resource sets are located in different frequency domain bandwidths; or
all second control channel resource sets in the P frequency domain bandwidths;
where P is a positive integer greater than or equal to 1.

The second control channel resource sets satisfy at least one of following characteristics:
one of the second control channel resource sets is associated with one control information load range;
an intersection among control information load ranges associated with different second control channel resource sets in one frequency domain bandwidth is empty; or
time domain characteristics of control channel resources in one of the second control channel resource sets are the same.

In the embodiments of the present disclosure, the step in which the spatial relationship information of the at least one control channel resource is determined or updated includes at least one of:
spatial relationship information of a first control channel resource is determined according to spatial relationship information of a second control channel resource; first information of the first control channel resource is identical to first information of the second control channel resource; for example, the spatial relationship information of the first control channel resource is the spatial relationship information of the second control channel resource; or the spatial relationship information of the first control channel resource includes the spatial relationship information of the second control channel resource; or, other determination manners are adopted; and a specific determination manner is not used for limiting the protection scope of the embodiments of the present disclosure;
in a case where spatial relationship information of a second control channel resource is updated, spatial relationship information of a first control channel resource is determined according to the updated spatial relationship information of the second control channel resource;
spatial relationship information of a third control channel resource is determined or updated according to spatial relationship information of a fourth control channel resource in a third control channel resource set, where the third control channel resource is not configured with the spatial relationship information or the spatial relationship information of the third control channel resource is not updated, and the fourth control channel resource is configured with the spatial relationship information or the spatial relationship information of the fourth control channel resource is updated; for example, the spatial relationship information of the third control channel resource is determined as the spatial relationship information of the fourth control channel resource in the third control channel resource set, where the third control channel resource is not configured with the spatial relationship information, and the fourth control channel resource is configured with the spatial relationship information or the spatial relationship information of the fourth control channel resource is updated; or the spatial relationship information of the third control channel resource includes the spatial relationship information of the fourth control channel resource in the third control channel resource set, where the third control channel resource is not configured with the spatial relationship information, and the fourth control channel resource is configured with the spatial relationship information or the spatial relationship information of the fourth control channel resource is updated; or other determination manners are adopted; and a specific determination manner is not used for limiting the protection scope of the embodiments of the present disclosure; or
first information is included in an acquisition parameter of the spatial relationship information of the control channel resource.

The second control channel resource satisfies at least one of following characteristics: the second control channel resource is a control channel resource satisfying a predetermined characteristic among control channel resources which have same first information;
the second control channel resource is a control channel resource satisfying the predetermined characteristic among control channel resources which have same first information and of which spatial relationship information updating signaling has latest start time; or
first information of the second control channel resource is identical to first information of first control channel resource.

Characteristics of the fourth control channel resource include at least one of:
the fourth control channel resource includes a control channel resource with a control channel resource index satisfying a predetermined characteristic in the third control channel resource set; the fourth control channel resource includes a control channel resource with a control channel resource index satisfying a predetermined characteristic in a fourth control channel resource set, where the fourth control channel resource set includes a control channel resource which has same first information as the third control channel resource in the third control channel resource set; or first information of the fourth control channel resource is identical to first information of the third control channel resource.

Control channel resources satisfying specific characteristics include a control channel resource with a lowest or highest control channel resource index.

The control information includes at least one of uplink control information or downlink control information;
The uplink control information includes an ACK/NACK, a CSI, or a schedule request (SR); and the downlink control information includes downlink control information (DCI).

According to the embodiments of the present disclosure, the spatial relationship information of the at least one control channel resource is indicated through the first control signaling and/or the spatial relationship information of the at least one control channel resource is determined according to the predetermined rule, so that the spatial relationship information does not need to be activated or updated by adopting the MAC-CE command for each PUCCH resource, which can reduce a load of the MAC-CE command while guaranteeing flexible switching of sending beams.

Another embodiment of the present disclosure proposes an apparatus for determining spatial relationship information. The apparatus includes a processor and a computer-readable storage medium, where the computer-readable storage medium stores instructions, and the instructions, when executed by the processor, implement any one of the methods for determining spatial relationship information described above.

Another embodiment of the present disclosure proposes a computer-readable storage medium. The computer-readable storage medium stores computer programs, where the computer programs, when executed by a processor, implement steps of any one of the methods for determining spatial relationship information described above.

Figure 14:
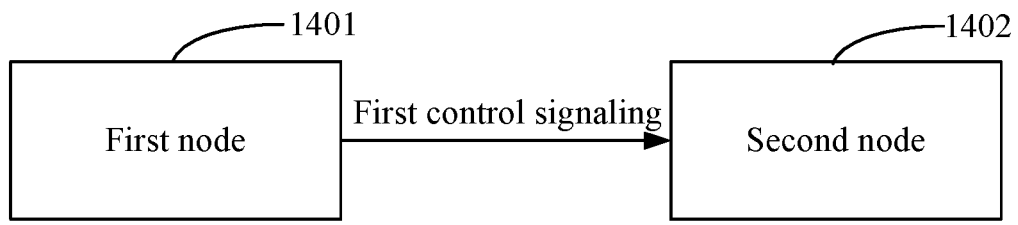
FIG. 14 is a schematic diagram of a structural composition of a system for determining spatial relationship information proposed by an embodiment of the present disclosure.

Referring to FIG. 14, another embodiment of the present disclosure proposes a system for determining spatial relationship information. The system includes a first node 1401 and a second node 1402. The first node 1401 is configured to perform at least one of following steps: sending first control signaling; where the first control signaling is used for indicating spatial relationship information of at least one control channel resource; determine and/or update the spatial relationship information of the at least one control channel resource according to a predetermined rule or the first control signaling. The second node 1402 is configured to perform at least one of following steps: the first control signaling is received; and the spatial relationship information of the at least one control channel resource is determined or updated according to the predetermined rule and/or the first control signaling.

In the embodiments of the present disclosure, the control channel resource includes at least one of an uplink control channel resource or a downlink control channel resource.

In the embodiments of the present disclosure, the control channel includes at least one of an uplink control channel such as a PUCCH or a downlink control channel.

In the embodiments of the present disclosure, the first control signaling includes a MAC-CE command.

In the embodiments of the present disclosure, the first control signaling carries at least one of first information, first spatial relationship information, parameter set selection information, or at least one piece of control channel resource information.

The first information includes at least one of: second spatial relationship information, relative information of the control channel resource in a first control channel resource set, format information of the control channel resource, first control channel resource set information, information of a control channel resource group, time domain characteristics of the control channel resource, or channel state information (CSI)-report configuration information corresponding to the control channel resource.

In the embodiments of the present disclosure, the method includes at least one of: the first spatial relationship information includes index information of the first spatial relationship information;
the control channel resource information includes index information of the control channel resource;
the second spatial relationship information includes index information of the second spatial relationship information;
the relative information of the control channel resource in the control channel resource set includes index information of the control channel resource in the control channel resource set; the control channel resource set information includes index information of the control channel resource set;
the information of the control channel resource group includes index information of the control channel resource group;
the time domain characteristics of the control channel resource include at least one of periodic, aperiodic or semi-persistent; or
the CSI-report configuration information corresponding to the control channel resource includes a CSI-Report setting index corresponding to the control channel resource.

In the embodiments of the present disclosure, in the first control signaling, a number of bits occupied by a notification region of the first spatial relationship information or the second spatial relationship information is P or $\lceil \log_2 P \rceil$; where P is a number of spatial relationship information elements included in a spatial relationship information set.

In the embodiments of the present disclosure, the control channel resource group satisfies at least one of following characteristics:
the control channel resource group is acquired by grouping control channel resources in the first control channel resource set according to second control signaling and/or a predetermined rule; where the first control channel resource set includes at least one of a predetermined control channel resource list or a control channel resource set where control channel resources are located;
a number N of control channel resource groups is associated with a number M of spatial relationship information elements included in a spatial relationship information set; or
the control channel resource group is acquired by grouping the control channel resources in the first control channel resource set according to the first information.

The second control signaling includes at least one of following signaling: RRC signaling, MAC-CE, or physical layer control signaling.

Specifically, for example, control channel resources included in the control channel resource group are notified in the second control signaling, or the first information is notified in the second control signaling, and one group in which the first information is the same is formed, and other grouping manners are not excluded, and/or it may be divided into N groups uniformly according to the predetermined rules, for example. Each group includes a same number of PUCCH resources, and when a uniform grouping is not possible, a predetermined processing is performed, for example, in the manners described in an embodiment 1.

In the embodiments of the present disclosure, the method includes at least one of: the parameter set selection information being used for indicating a parameter set included in the first control signaling; or the parameter set selection information being associated with at least one of following information: whether a special control channel resource is configured or not, whether the spatial relationship information of the control channel resource is configured or not, or whether a radio resource control (RRC) link state is entered or not.

For example, before a special uplink control channel resource is not configured, a value of the parameter set selection information is a fixed value, and after the special uplink control channel resource is configured, a value range of the parameter set selection information may be larger, or before the special uplink control channel resource is not configured, the control signaling does not carry the parameter set selection information, and after the special uplink control channel resource is configured, the control signaling carries the parameter set selection information.

In the embodiments of the present disclosure, the second node 1402 is configured to determine or update the spatial relationship information of the at least one control channel resource in at least one of following manners:

spatial relationship information of at least one control channel resource corresponding to the first information is determined or updated as the first spatial relationship information; or spatial relationship information of a control channel resource corresponding to the at least one piece of control channel resource information is determined or updated as the first spatial relationship information.

The at least one control channel resource corresponding to the first information includes at least one of:

at least one control channel resource which has same first information; or at least one control channel resource in a first control channel resource set corresponding to the first information.

In the embodiments of the present disclosure, the first control channel resource set includes at least one of:

a control channel resource in P frequency domain bandwidths; where P is a positive integer greater than or equal to 1;

a control channel resource with a same time domain characteristic; where the time domain characteristics include at least one of aperiodic, periodic or semi-persistent;

control information which is included in a control channel resource and includes at least one of acknowledgement character (ACK) information or negative acknowledgement character (NACK) information, or channel state information (CSI);

a candidate control channel resource set for feeding back the ACK information or the NACK information; where when the ACK information or the NACK information is fed back, one control channel resource is selected from the candidate control channel resource set;

P second control channel resource sets in the P frequency domain bandwidths; where in a case where P is greater than 1, different control channel resources in the P second control channel resource sets are located in different frequency domain bandwidths; or all second control channel resource sets in the P frequency domain bandwidths;

where P is a positive integer greater than or equal to 1.

The second control channel resource sets satisfy at least one of following characteristics:

one of the second control channel resource sets is associated with one control information load range;

an intersection among control information load ranges associated with different second control channel resource sets in one frequency domain bandwidth is empty; or time domain characteristics of control channel resources in one of the second control channel resource sets are the same.

In the embodiments of the present disclosure, the step in which the spatial relationship information of the at least one control channel resource is determined or updated includes at least one of:

spatial relationship information of a first control channel resource is determined according to spatial relationship information of a second control channel resource; first information of the first control channel resource is identical to first information of the second control channel resource; for example, the spatial relationship information of the first control channel resource is the spatial relationship information of the second control channel resource; or the spatial relationship information of the first control channel resource includes the spatial relationship information of the second control channel resource; or, other determination manners are adopted; and a specific determination manner is not used for limiting the protection scope of the embodiments of the present disclosure;

in a case where spatial relationship information of a second control channel resource is updated, spatial relationship information of a first control channel resource is determined according to the updated spatial relationship information of the second control channel resource;

spatial relationship information of a third control channel resource is determined or updated according to spatial relationship information of a fourth control channel resource in a third control channel resource set, where the third control channel resource is not configured with the spatial relationship information or the spatial relationship information of the third control channel resource is not updated, and the fourth control channel resource is configured with the spatial relationship information or the spatial relationship information of the fourth control channel resource is updated; for example, the spatial relationship information of the third control channel resource is determined as the spatial relationship information of the fourth control channel resource in the third control channel resource set, where the third control channel resource is not configured with the spatial relationship information, and the fourth control channel resource is configured with the spatial relationship information or the spatial relationship information of the fourth control channel resource is updated; or the spatial relationship information of the third control channel resource includes the spatial relationship information of the fourth control channel resource in the third control channel resource set, where the third control channel resource is not configured with the spatial relationship information, and the fourth control channel resource is configured with the spatial relationship information or the spatial relationship information of the fourth control channel resource is updated; or other determination manners are adopted; and a specific determination manner is not used for limiting the protection scope of the embodiments of the present disclosure; or first information is included in an acquisition parameter of the spatial relationship information of the control channel resource.

The second control channel resource satisfies at least one of following characteristics: the second control channel resource is a control channel resource satisfying a predetermined characteristic among control channel resources which have same first information;
the second control channel resource is a control channel resource satisfying the predetermined characteristic among control channel resources which have same first information and of which spatial relationship information updating signaling has latest start time; or
first information of the second control channel resource is identical to first information of the first control channel resource.

Characteristics of the fourth control channel resource include at least one of:
the fourth control channel resource includes a control channel resource with a control channel resource index satisfying a predetermined characteristic in the third control channel resource set; the fourth control channel resource includes a control channel resource with a control channel resource index satisfying a predetermined characteristic in a fourth control channel resource set, where the fourth control channel resource set includes a control channel resource which has same first information as the third control channel resource in the third control channel resource set; or first information of the fourth control channel resource is identical to first information of the third control channel resource.

Control channel resources satisfying specific characteristics include a control channel resource with a lowest or highest control channel resource index.

The control information includes at least one of uplink control information or downlink control information;
The uplink control information includes an ACK/NACK, a CSI, or a schedule request (SR); and the downlink control information includes downlink control information (DCI).

According to the embodiments of the present disclosure, the spatial relationship information of the at least one control channel resource is indicated through the first control signaling and/or the spatial relationship information of the at least one control channel resource is determined according to the predetermined rule, so that the spatial relationship information does not need to be activated or updated by adopting different MAC-CE commands for different PUCCH resources, which can reduce a load of the MAC-CE command while guaranteeing flexible switching of sending beams.

In long term evolution (LTE), HARQ feedback information is in the unit of a transport block (TB), and in a 5G system, a number of coding blocks (CBs) contained within one TB is greatly increased compared to 4G. Therefore, if a whole TB is retransmitted due to errors of a few CBs in one TB, system resources are wasted, and further the performance of the system is reduced. Based on this consideration, in the 3GPP standardization meeting, a resolution for HARQ feedback is performed according to a code block group (CBG).

The HARQ feedback is performed according to the CBG, that is, CBs within one transmission block are divided into multiple groups, namely, CBGs, the ACK/NACK is fed back for each CBG when the HARQ feedback is performed, compared with a manner in a 4G system, this manner can reduce waste of system resources, but a number of ACK/NACK feedback bits configured for a simple system is fixed, therefore, a condition that there is no CBG and ACK/NACK feedback bits corresponding to the CBG exists, that is, a number of CBGs actually included in a current TB is less than a number of the ACK/NACK feedback bits, and no CBG and the ACK/NACK feedback bits corresponding to the CBG adopt a filling manner, in an embodiment, in a semi-static ACK/NACK feedback codebook in NR, each CC corresponds to a fixed number of ACK/NACK feedback bits, and even if the PDSCH is not detected in the CC, at this time, the ACK/NACK feedback bits also adopt a filling manner, so that resource waste is caused, and unnecessary power consumption loss of the terminal is also caused.

Another embodiment of the present disclosure proposes a method for transmitting an information element. The method includes:
first-type information elements are transmitted; and
a type of information carried in M bit regions in the first-type information elements is determined according to at least one of a detection condition of second-type information elements or signaling information;
where the type of the information includes at least one of an acknowledgement (ACK) or negative acknowledgement (NACK) obtained according to a decoding result, second information or a default value; and
where M is a positive integer greater than or equal to 1, and each of the M bit regions includes one or more bits.

According to the embodiments of the present disclosure, the M bit regions in the first-type information elements carry at least one of the acknowledgement (ACK) or negative acknowledgement (NACK) obtained according to the decoding result, second information or a default value, that is, the ACK or NACK obtained according to the decoding result is not carried alone, and other information is carried, so that resource waste is reduced or even avoided, and thus unnecessary power consumption loss of the terminal is reduced or even avoided.

The default value, i.e. the fixed value, may be an arbitrary value, such as ACK or NACK.

In the embodiments of the present disclosure, the step in which the type of the information carried in the M bit regions in the first-type information elements is determined according to the detection condition of the second-type information elements includes:
the type of the information carried in the M bit regions is the second information or the default value in a case where the detection condition of the second-type information elements satisfies at least one of following characteristics:
the second-type information elements include one or more third-type information elements and do not include third-type information elements corresponding to the M bit regions; where the third-type information elements corresponding to the M bit regions may be part or all of the third-type information elements corresponding to the M bit regions, and one bit region corresponds to one third-type information element;
a control channel scheduling the second-type information elements is not detected; the second-type information elements are not detected;
an intersection among transmission information included in N second-type information elements is non-empty, where N is a positive integer greater than 1; or
an intersection between transmission information included in one second-type information element and transmission information included in another second-type information element is non-empty.

The step in which the type of the information carried in the M bit regions is the second information or the default value includes: whether the second information or the default value being carried in the M bit regions is determined according to the signaling information. The M bit regions are correspondence to M second-type information elements among the N second-type information elements.

In the embodiments of the present disclosure, the step in which the type of the information carried in the M bit regions in the first-type information elements is determined according to the detection condition of the second-type information elements includes:

it is determined that the type of the information carried in the M bit regions is the ACK or NACK obtained according to the decoding result in a case where the detection condition of the second-type information elements satisfies at least one of following characteristics:

the second-type information elements include one or more third-type information elements, and the second-type information elements include third-type information elements corresponding to the M bit regions; where the third-type information elements corresponding to the M bit regions may be part or all of the third-type information elements corresponding to the M bit regions, and one bit region corresponds to one third-type information element;

a control channel scheduling the second-type information elements is detected;

the second-type information elements are detected; or an intersection among transmission information included in N second-type information elements is empty, where N is a positive integer greater than 1.

The acknowledgement (ACK) or negative acknowledgement (NACK) obtained according to the decoding result includes an ACK/NACK obtained according to whether the decoding of the second-type information elements/the third-type information elements is successful or not, i.e. the ACK or NACK obtained according to the decoding result includes any one of:

an ACK or NACK obtained according to decoding results of the second-type information elements; or an ACK or NACK according to decoding results of the third-type information elements in the second-type information elements.

In the embodiments of the present disclosure, the step in which whether ACK information or NACK information being carried in the bit regions is determined includes at least one of:

when the detection of the second-type information elements is successful, the ACK information being carried in the bit regions is determined;

when the detection of the second-type information elements is not successful, the NACK information being carried in the bit regions is determined;

when the detection of the third-type information elements is successful, the ACK information being carried in the bit regions is determined; or when the detection of the third-type information elements is not successful, the NACK information being carried in the bit regions is determined.

In the embodiments of the present disclosure, the M bit regions include at least one of following bit regions:

a bit region in which the third-type information elements corresponding to the M bit regions are not included in the second-type information elements;

a bit region in the first-type information elements determined according to the signaling information; or a bit region in which ACK information of third-type information elements corresponding to this bit region has already been sent before the first-type information elements are sent; where the ACK information indicates that the third-type information elements have been successfully decoded.

In the embodiments of the present disclosure, the M bit regions include at least one of following bit regions:

last Nmax-Ncur bits corresponding to one transport block (TB) in the first-type information elements;

Nmax or Ncur bits corresponding to one TB not enabled in a physical downlink shared channel (PDSCH) in the first-type information elements;

a bit region corresponding to third-type information elements which are decoded successfully before, are included in the first-type information elements and are not included in current second-type information elements;

a bit region corresponding to the M second-type information elements among the N second-type information elements in the first-type information elements, where an intersection among transmission information included in the N second-type information elements is non-empty, and N is a positive integer greater than 1;

a bit region located in an ACK/NACK semi-static feedback codebook and to which the M bit regions belong, where the bit region is determined according to at least one of following information: a carrier member (CC) index, a time unit index or a candidate data channel index; or a bit region in an ACK/NACK semi-static feedback codebook determined according to the signaling information, where the signaling information carries at least one of following information corresponding to the bit region: the CC index, the time unit index, a candidate data channel opportunity index, or a type of information carried by the bit region;

where Nmax is a maximum number of code block groups (CBGs) included in the one TB, and Ncur is a number of third type information elements actually included in the one TB.

In the embodiments of the present disclosure, the second information includes at least one of: resource request information, a SR, preferred reference signal indication information, beam failure request information, or channel state information (CSI).

The CSI includes at least one of following information: precoding matrix information, rank information (e.g., rank indicator (RI)), CSI-RS resource indicator (CRI), reference signal receiving power (RSRP) information, SS/PBCH block resource indicator (SSBRI), channel quality information (CQI), preferred layer, layer indicator (LI), and the like.

In the embodiments of the present disclosure, it satisfies at least one of following characteristics:

the second-type information elements and/or the third-type information elements include one of a data channel, a transmission block (TB), a code word block (CW), a code block (CB), a code block group (CBG), candidate data channel opportunity, or information elements corresponding to the first-type information elements; or the first-type information elements includes one of: an ACK or NACK feedback codebook, a physical uplink control channel (PUCCH) resource carrying the ACK or NACK, an ACK or NACK semi-static feedback codebook, or control information with a bit number greater than a predetermined value.

Embodiment 4

In this embodiment, hybrid automatic repeat request acknowledgement (HARQ-ACK) feedback information and the second information share a bit region. In an embodiment, whether the bit region being used for indicating the HARQ-ACK or the second information is determined according to a transmission condition of the data channel corresponding to the bit region. The second information includes at least one of following information: resource request information, schedule request (SR), preferred reference signal indication information, beam failure request information, channel state information (CSI). The channel state information (CSI) includes at least one of following information: a channel quality indicator (CQI), a precoding matrix indicator (PMI), rank information, a CSI-RS resource indicator (CRI), a SS/PBCH block resource indicator (SSBRI), a layer indicator (LI), a rank indicator (RI), a layer 1 reference signal receiving power (L1-RSRP).

The preferred reference signal indication information and the beam failure request information are mainly used in a beam failure recovery process, and a terminal selects one or more pieces of preferred reference signal indication information from a second reference signal set so as to be reported to a base station when a beam failure event is detected by detecting reference signals in a first reference signal set.

The beam failure request information is used for indicating at least one of following information: a number of times that the reference signal performance in the first reference signal set is lower than a predetermined value is greater than a predetermined number; or the performance of one or more reference signals in the second reference signal set is higher than a predetermined value.

Figure 15:
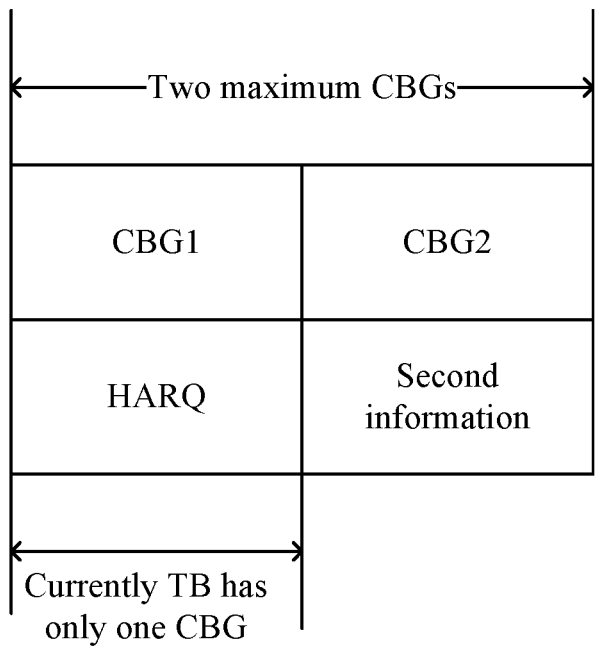
FIG. 15 is a schematic diagram illustrating that a feedback bit of a default feedback NACK is borrowed for a SR feedback when a number of CBGs in a first transmission is less than a maximum number of CBGs in a HARQ-ACK feedback codebook according to an embodiment of the present disclosure.

Specifically, for example, $B_{TB}^{max}$ bits in a HARQ-ACK codebook corresponding to one transport block (TB), where $B_{TB}^{max}$ is a cell-specific semi-static value configured for the RRC signaling and represents a maximum number of code block groups (CBG) included in one TB, while in a current PDSCH transmission, a first transmission of the one TB includes $B_{TB}^{cur}$ CBGs, when the terminal feeds back the HARQ-ACK codebook, no matter how much $B_{TB}^{cur}$ is actually, the number $B_{TB}^{max}$ of bits corresponding to the TB in the HARQ-ACK codebook, particularly when $B_{TB}^{max}$ is greater than $B_{TB}^{cur}$, a number of CBGs included in the TB is $B_{TB}^{cur}$, and the last $B_{TB}^{max}-B_{TB}^{cur}$ bits corresponding to the TB may be used for the transmission of the second information, as shown in FIG. 15, for example, $B_{TB}^{max}$ is 2, and $B_{TB}^{cur}$ is 1, one HARQ-ACK feedback bit of the HARQ-ACK feedback bits corresponding to the TB in the HARQ-ACK codebook, which is not used for feeding back HARQ-ACK, may be used for the transmission of the second information. When $B_{TB}^{max}$ is equal to $B_{TB}^{cur}$, 2 feedback bits in FIG. 15 are used for the feedback of the HARQ-ACK, each bit corresponds to one CBG, and whether the bit fills the ACK or the NACK is determined according to whether decoding of the CBG corresponding to this bit is successful or not.

Figure 16:
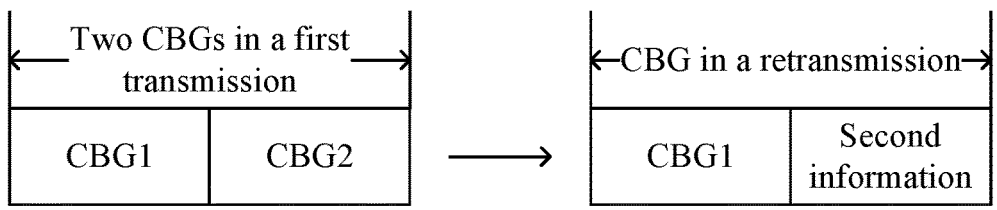
FIG. 16 is a schematic diagram illustrating that a HARQ-ACK feedback bit of a CBG not included in a retransmission is borrowed for a SR feedback when a number of CBGs in the retransmission is less than a number of CBGs in a first transmission in a HARQ-ACK feedback codebook according to an embodiment of the present disclosure.
Figure 17:
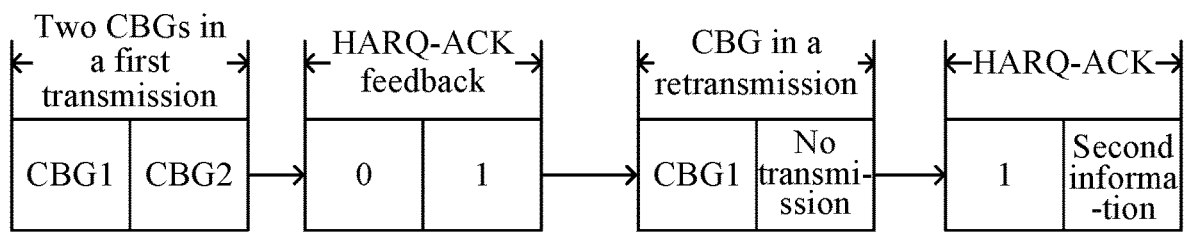
FIG. 17 is a schematic diagram illustrating that a HARQ-ACK feedback bit of CBGs, which are not included in a PDSCH of this ACK retransmission and are fed back before a retransmission, is borrowed for a SR feedback when a number of CBGs in a retransmission is less than a number of CBGs in a first transmission in a HARQ-ACK feedback codebook according to an embodiment of the present disclosure.
Figure 18:
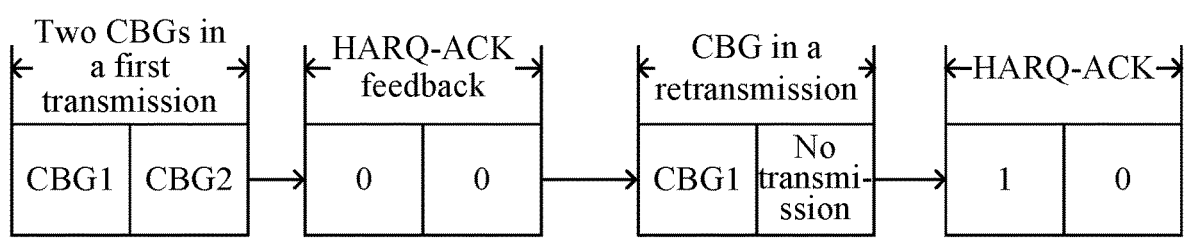
FIG. 18 is a schematic diagram illustrating that a HARQ-ACK feedback bit of CBGs, which are not included in a PDSCH of this NACK retransmission and are fed back before a retransmission, is not borrowed for a SR feedback and continues to be used for a HARQ-ACK feedback when a number of CBGs in a retransmission is less than a number of CBGs in a first transmission in a HARQ-ACK feedback codebook according to an embodiment of the present disclosure.

Or, as shown in FIG. 16, the first transmission is 2 CBGs, and only CBG1 is transmitted in PDSCH during repeated transmission, a second feedback bit may be used for transmission of the second information during the HARQ-ACK feedback after retransmission, and a first feedback bit is used for HARQ-ACK feedback obtained according to the decoding result of CBG1. In an embodiment, if the terminal successfully decodes one CBG after the first transmission, the HARQ-ACK feedback bit of the CBG is 1 (i.e., successful decoding), and the CBG is not transmitted during retransmission (indicating that the HARQ-ACK feedback bit corresponding to the CBG is also successfully received by the base station), HARQ-ACK is not fed back to the CBG in HARQ-ACK feedback after the retransmission, and the bit occupied by the CBG in the HARQ-ACK feedback information is used for a feedback of second information, as shown in FIG. 17. If CBG2 is transmitted in the first transmission, the terminal does not successfully decode, HARQ-ACK bit 0 is fed back (i.e., failure decoding), and the CBG2 is not retransmitted in the retransmission of the TB, in HARQ-ACK feedback after retransmission, for the CBG2 to feed back bit 0, the feedback bit region cannot be used for indication/transmission of second information.

In an embodiment, in a semi-static codebook feedback, no matter whether the terminal receives the PDSCH in one CC or not, the HARQ-ACK feedback bit is fed back, and this feedback bit is only filled with a default value (such as NACK, and of course the default value may also be ACK), thereby causing resource waste, and at this time, it may be stipulated that in the semi-static codebook feedback, the terminal does not receive the scheduling of the DL-Grant and/or does not receive the PDSCH in one CC, the feedback bit region may be used for the feedback of the second information. Or the HARQ-ACK feedback bit region of the predetermined CC is determined to be used for the feedback of the second information through signaling information and/or a predetermined rule, and when there is no corresponding PDSCH for a HARQ-ACK feedback bit region belonging to non-predetermined CC, only a default value NACK is fed back. In summary, it is possible to determine a predetermined bit region in the semi-static HARQ-ACK feedback codebook for the transmission of the second information according to the predetermined rule and/or the signaling information, or the type of the information carried in a predetermined bit region in the semi-static HARQ-ACK feedback codebook may be determined according to the predetermined rule and/or the signaling information, according to a detection condition of PDSCH/TB/CBG (i.e. the second-type information element) corresponding to the predetermined bit region, and/or according to a detection condition of a control channel for scheduling the second-type information elements. When the second-type information elements are detected and/or the control channel scheduling the second-type information elements are detected, and the predetermined bit region is used for carrying the ACK/NACK information obtained according to the decoding result of the second-type information, otherwise, the predetermined bit region is used for carrying the second information.

In an embodiment, the predetermined bit region of a semi-static codebook described above may be determined by at least one of following information notified in RRC signaling/MAC-CE signaling/DCI signaling: a carrier component (CC) index, a time unit index, a candidate data channel index, or a type of information carried in the bit region, and it may also be determined which of following information types carried in the bit region is according to the type of the information carried in the bit region notified in the RRC signaling/MAC-CE signaling/DCI signaling: an acknowledgement (ACK) or a negative acknowledgement (NACK) obtained according to a decoding result, second information and a default value. For example, if the RRC signaling/MAC-CE signaling/DCI signaling is notified to the terminal by the base station, then the terminal determines the predetermined bit region according to the information carried in the signaling, and determines the type of the information carried in the predetermined bit region according to a detection result of the PDSCH corresponding to the predetermined bit region. Or the terminal determines the type of the information carried by the predetermined bit region according to the type of the information carried by the bit region carried in the signaling, for example, the signaling notifies that the bit regions may only carry the second information, or the bit regions determine whether to carry a default value or a result of whether decoding being successful or not according to the detection result of the PDSCH.

In an embodiment, in a case where one PDSCH may include 2 TBs at most, but an actual current PDSCH includes only one TB, one TB is not enabled, and a HARQ-ACK feedback corresponding to a disabled TB may also be used for the feedback of the second information.

In summary, in the above methods, a feedback bit region in which having no CBG/PDSCH and corresponding to the CBG/PDSCH in the HARQ-ACK feedback information is used for the feedback of the second information. Or a HARQ-ACK feedback bit region of a default feedback NACK may be used for the feedback of the second information. For example, through signaling information configuration, whether the HARQ-ACK feedback bit region of the default feedback NACK is used for feeding back the default NACK or for feeding back the second information; or through the signaling information and/or the predetermined rule, it is determined that the predetermined bit region may be used for feeding back the second information when feeding back the default NACK, and the bit region of the non-predetermined bit region only feeds back the NACK and cannot be used for feeding back the second information when feeding back the default NACK.

Embodiment 5

In this embodiment, it is determined that HARQ-ACK feedback bits corresponding to one or more of the N second-type information elements are used for a feedback of second information according to whether an intersection between transmission information included in the N second-type information elements is empty, and the second information includes at least one of following information: resource request information, schedule request (SR), preferred reference signal indication information, beam failure request information, channel state information (CSI). The channel state information (CSI) includes at least one of following information: a channel quality indicator (CQI), a precoding matrix indicator (PMI), rank information, a CSI-RS resource indicator (CRI), a SS/PBCH block resource indicator (SSBRI), a layer indicator (LI), a rank indicator (RI), a layer 1 reference signal receiving power (L1-RSRP). The transmission information is information bits included in the second-type information elements before channel coding.

The preferred reference signal indication information and the beam failure request information are mainly used in a beam failure recovery process, and a terminal selects one or more pieces of preferred reference signal indication information from a second reference signal set so as to be reported to a base station when a beam failure event is detected by detecting reference signals in a first reference signal set.

The beam failure request information is used for indicating at least one of following information: a number of times that the reference signal performance in the first reference signal set is lower than a predetermined value is greater than a predetermined number; or the performance of one or more reference signals in the second reference signal set is higher than a predetermined value.

In an embodiment, the transmission information includes information bits before channel coding.

For example, when repeated transmission information is included between two TB/CWs scheduled by one DCI, that is, the intersection of the transmission information included in the two TB/CWs is not empty, a HARQ-ACK feedback bit corresponding to one TB/CW may be used for the feedback of the second information, for example, the two TB/CWs correspond to a quasi-co-location reference signal set and/or a demodulation reference signal group, respectively. For example, in a scene that two transmission nodes are adopted to send the same transmission information to a same terminal on the same time-frequency resource in a space division mode, so that the information transmission robustness is enhanced and the time delay is reduced.

Or when repeated transmission information is included between a number N of TB/CWs scheduled by more than one DCI, i.e., the intersection of transmission information included in the number N of TB/CWs is not empty, HARQ-ACK feedback bits corresponding to part of the TB/CWs may be used for the feedback of the second information, the HARQ-ACK feedback bits corresponding to the number N of TB/CWs fall in a same time unit, and/or the HARQ-ACK feedback bits corresponding to the number N of TB/CWs are transmitted after the number N of TB/CWs are transmitted, i.e., HARQ-ACK feedback for the number N of TB/CWs is not included among the number N of TB/CW transmissions, for example, the number N of TB/CWs respectively correspond to a quasi-co-location reference signal set and/or a demodulation reference signal group, for example, in a scene that multiple transmission nodes are adopted to send the same transmission information to the same terminal in a predetermined time unit, so that the information transmission robustness is enhanced and the time delay is reduced.

Another embodiment of the present disclosure proposes an apparatus for transmitting an information element. The apparatus includes a second transmission module. The second transmission module is configured to transmit first-type information elements. A type of information carried in M bit regions in the first-type information elements is determined according to at least one of a detection condition of second-type information elements or signaling information. The type of the information includes at least one of an acknowledgement (ACK) or negative acknowledgement (NACK) obtained according to a decoding result, second information or a default value. M is a positive integer greater than or equal to 1, and each of the M bit regions includes one or more bits.

The default value, i.e. the fixed value, may be an arbitrary value, such as ACK or NACK.

In the embodiments of the present disclosure, the second transmission module is configured to implement that the type of the information carried in the M bit regions in the first-type information elements is determined according to the detection condition of the second-type information elements by adopting following manners.

the type of the information carried in the M bit regions is determined to be the second information or the default value in a case where the detection condition of the second-type information elements satisfies at least one of following characteristics:

the second-type information elements include one or more third-type information elements and do not include third-type information elements corresponding to the M bit regions; where the third-type information elements corresponding to the M bit regions may be part or all of the third-type information elements corresponding to the M bit regions, and one bit region corresponds to one third-type information element;

a control channel scheduling the second-type information elements is not detected; the second-type information elements are not detected;

an intersection among transmission information included in N second-type information elements is non-empty, where N is a positive integer greater than 1; or an intersection between transmission information included in one second-type information element and transmission information included in another second-type information element is non-empty.

The second transmission module is configured to implement that the type of the information carried in the M bit regions is the second information or the default value by adopting following manners: whether the second information or the default value being carried in the M bit regions is determined according to the signaling information. The M bit regions are correspondence to M second-type information elements among the N second-type information elements.

In the embodiments of the present disclosure, the second transmission module is configured to implement that the type of the information carried in the M bit regions in the first-type information elements is determined according to the detection condition of the second-type information elements by adopting following manners.

it is determined that the type of the information carried in the M bit regions is the ACK or NACK obtained according to the decoding result in a case where the detection condition of the second-type information elements satisfies at least one of following characteristics:

the second-type information elements include one or more third-type information elements, and the second-type information elements include third-type information elements corresponding to the M bit regions; where the third-type information elements corresponding to the M bit regions may be part or all of the third-type information elements corresponding to the M bit regions, and one bit region corresponds to one third-type information element;

a control channel scheduling the second-type information elements is detected;

the second-type information elements are detected; or an intersection among transmission information included in N second-type information elements is empty, where N is a positive integer greater than 1.

The second transmission module is configured to implement the ACK or NACK obtained according to the decoding result by adopting any one of following manners:

an ACK or NACK obtained according to decoding results of the second-type information elements; or an ACK or NACK according to decoding results of the third-type information elements in the second-type information elements.

In the embodiments of the present disclosure, the second transmission module is configured to implement that ACK information or NACK information is carried in the bit regions by adopting following manners:

when the detection of the second-type information elements is successful, the ACK information being carried in the bit regions is determined;

when the detection of the second-type information elements is not successful, the NACK information being carried in the bit regions is determined;

when the detection of the third-type information elements is successful, the ACK information being carried in the bit regions is determined; or when the detection of the third-type information elements is not successful, the NACK information being carried in the bit regions is determined.

In the embodiments of the present disclosure, the M bit regions include at least one of following bit regions:

a bit region in which the third-type information elements corresponding to the M bit regions are not included in the second-type information elements;

a bit region in the first-type information elements determined according to the signaling information; or a bit region in which ACK information of third-type information elements corresponding to this bit region has already been sent before the first-type information elements are sent; where the ACK information indicates that the third-type information elements have been successfully decoded.

In the embodiments of the present disclosure, the M bit regions include at least one of following bit regions:

last Nmax-Ncur bits corresponding to one transport block (TB) in the first-type information elements;

Nmax or Ncur bits corresponding to one TB not enabled in a physical downlink shared channel (PDSCH) in the first-type information elements;

a bit region corresponding to third-type information elements which are decoded successfully before, are included in the first-type information elements and are not included in current second-type information elements;

a bit region corresponding to the M second-type information elements among the N second-type information elements in the first-type information elements, where an intersection among transmission information included in the N second-type information elements is non-empty, and N is a positive integer greater than 1;

a bit region located in an ACK/NACK semi-static feedback codebook and to which the M bit regions belong, where the bit region is determined according to at least one of following information: a carrier member (CC) index, a time unit index or a candidate data channel index; or a bit region in an ACK/NACK semi-static feedback codebook determined according to the signaling information, where the signaling information carries at least one of following information corresponding to the bit region: the CC index, the time unit index, a candidate data channel opportunity index, or a type of information carried by the bit region;

where Nmax is a maximum number of code block groups (CBGs) included in the one TB, and Ncur is a number of third type information elements actually included in the one TB.

In the embodiments of the present disclosure, the second information includes at least one of: resource request information, a SR, preferred reference signal indication information, beam failure request information, or channel state information (CSI).

The CSI includes at least one of following information: precoding matrix information, rank information (e.g., rank indicator (RI)), CSI-RS resource indicator (CRI), reference signal receiving power (RSRP) information, SS/PBCH block resource indicator (SSBRI), channel quality information (CQI), preferred layer, layer indicator (LI), and the like.

In the embodiments of the present disclosure, it satisfies at least one of following characteristics:

the second-type information elements and/or the third-type information elements include one of a data channel, a transmission block (TB), a code word block (CW), a code block (CB), a code block group (CBG), candidate data channel opportunity, or information elements corresponding to the first-type information elements; or the first-type information elements includes one of: an ACK or NACK feedback codebook, a physical uplink control channel (PUCCH) resource carrying the ACK or NACK, an ACK or NACK semi-static feedback codebook, or control information with a bit number greater than a predetermined value.

According to the embodiments of the present disclosure, the M bit regions in the first-type information elements carry at least one of the acknowledgement (ACK) or negative acknowledgement (NACK) obtained according to the decoding result, second information or a default value, that is, the ACK or NACK obtained according to the decoding result is not carried alone, and other information is carried, so that resource waste is reduced or even avoided, and thus unnecessary power consumption loss of the terminal is reduced or even avoided.

Another embodiment of the present disclosure proposes an apparatus for sending information. The apparatus includes a processor and a computer-readable storage medium, where the computer-readable storage medium stores instructions, and the instructions, when executed by the processor, implement any one of the methods for sending information described above.

An embodiment of the present disclosure proposes a computer-readable storage medium. The computer-readable storage medium stores computer programs, where the computer programs, when executed by a processor, implement steps of any one of the methods for sending information described above.

Those of ordinary skill in the art will appreciate that all or some of the steps in the methods, and functional modules/units in the systems and apparatus disclosed above may be implemented as software, firmware, hardware, and suitable combinations thereof. In a hardware implementation, the division between functional modules/units mentioned in the above description does not necessarily correspond to the division of physical assemblies; for example, one physical assembly may have multiple functions, or one function or step may be performed by multiple physical assemblies in cooperation. Some or all of the assemblies may be implemented as software executed by a processor, such as a digital signal processor or microprocessor, or as hardware, or as an integrated circuit, such as an application specific integrated circuit. Such software may be distributed on computer readable media, which may include computer storage media (or non-transitory media) and communication media (or transitory media). As is well known to those of ordinary skill in the art, the term "computer storage media" includes volatile and nonvolatile, removable and non-removable media implemented in a variety of methods or technologies for storage of information (such as computer readable instructions, data structures, program modules or other data). The computer storage media include, but are not limited to, a random access memory (RAM), a read-only memory (ROM), an electrically erasable programmable read only memory (EEPROM), a flash memory or other memory technology, a compact disc read-only memory (CD-ROM), a digital video disc (DVD), or other optical disk storage, magnetic cassettes, magnetic tapes, magnetic disk storage or other magnetic storage apparatuses, or a variety of other media which may be used for storing the desired information and which may be accessed by a computer. Further, it is well known to those of ordinary skill in the art that the communication media typically contain computer readable instructions, data structures, program modules, or other data in a modulated data signal such as a carrier wave or other transmission mechanism and may include a variety of information delivery media.

What is claimed is:

1. A method for determining spatial relationship information, comprising:
    transmitting first control signaling; and
    determining spatial relationship information of a plurality of control channel resources according to a predetermined rule and the first control signaling;
    wherein the plurality of control channel resources comprise a first control channel resource and a second control channel resource;
    wherein determining the spatial relationship information of the plurality of control channel resources according to the predetermined rule comprises: in response to the first control channel resource is not configured with spatial relationship information, determining the spatial relationship information of the first control channel resource according to spatial relationship information of the second control channel resource, wherein first information of the second control channel resource is identical to first information of the first control channel resource;
    the first control signaling comprises medium access control (MAC)-control element (CE) signaling that carries the spatial relationship information of the second control channel resource and index information of the second control channel resource but does not carry information of a control channel resource group comprised in the first information, and the first control signaling is used for indicating the spatial relationship information of the plurality of control channel resources; and
    in response to the plurality of control channel resources being uplink control channel resources, the first control channel resource is a first uplink control channel resource and the second control channel resource is a second uplink control channel resource;
    wherein the second control channel resource is a control channel resource satisfying a predetermined characteristic among control channel resources which have same first information.

2. The method of claim 1, wherein determining the spatial relationship information of the plurality of control channel resources comprises:
    determining the spatial relationship information of the plurality of control channel resources corresponding to first information as the spatial relationship information of the second control channel resource.

3. The method of claim 2, wherein the plurality of control channel resources corresponding to the first information comprise one of:
    at least one control channel resource which has same first information; or
    at least one control channel resource in a first control channel resource set corresponding to the first information.

4. The method of claim 1, wherein the control channel resource group satisfies following characteristic:
    the control channel resource group is acquired by grouping control channel resources in the first control channel resource set according to second control signaling; wherein the second control signaling is radio resource control (RRC) signaling and is used to notify control channel resources comprised in the control channel resource group.

5. The method of claim 3, wherein the first control channel resource set comprises:
    control channel resources in P frequency domain bandwidths;

wherein P is a positive integer greater than 1, and each of P frequency domain bandwidths is a component carrier (CC) or a bandwidth part (BWP);

wherein in response to the at least one control channel resource being a downlink control channel resource, the first control channel resource is a first downlink control channel resource and the second control channel resource is a second downlink control channel resource, the first information comprises index information of the second control channel resource in a second control channel resource set.

6. An apparatus for determining spatial relationship information, comprising a processor and a computer-readable storage medium, wherein the computer-readable storage medium stores instructions, and the instructions, when executed by the processor, implement:

transmitting first control signaling; and determining the spatial relationship information of a plurality of control channel resources according to a predetermined rule and the first control signaling;

wherein the plurality of control channel resources comprise a first control channel resource and a second control channel resource;

wherein the processor determines the spatial relationship information of the plurality of control channel resources according to the predetermined rule comprises: in response to the first control channel resource is not configured with spatial relationship information, determining the spatial relationship information of the first control channel resource according to spatial relationship information of the second control channel resource, wherein first information of the second control channel resource is identical to first information of the first control channel resource;

the first control signaling comprises medium access control (MAC)-control element (CE) signaling that carries the spatial relationship information of the second control channel resource and index information of the second control channel resource but does not carry information of a control channel resource group comprised in the first information, and the first control signaling is used for indicating the spatial relationship information of the plurality of control channel resources; and in response to the plurality of control channel resources being uplink control channel resources, the first control channel resource is a first uplink control channel resource and the second control channel resource is a second uplink control channel resource;

wherein the second control channel resource is a control channel resource satisfying a predetermined characteristic among control channel resources which have same first information.

7. A non-transitory computer-readable storage medium, storing computer programs, wherein the computer programs, when executed by a processor, implement the method of claim 1.

8. A system for determining spatial relationship information, comprising:

a first node, which is configured to perform: transmitting first control signaling and determining spatial relationship information of a plurality of control channel resources according to a predetermined rule and the first control signaling; and a second node, which is configured to perform at least one of following steps: receiving the first control signaling; and determining the spatial relationship information of the plurality of control channel resources according to the predetermined rule and the first control signaling;

wherein the plurality of control channel resources comprise a first control channel resource and a second control channel resource and the first node determines the spatial relationship information of the plurality of control channel resources by: in response to the first control channel resource is not configured with spatial relationship information, determining the spatial relationship information of the first control channel resource according to spatial relationship information of the second control channel resource, wherein first information of the second control channel resource is identical to first information of the first control channel resource;

wherein the first control signaling comprises medium access control (MAC)-control element (CE) signaling that carries the spatial relationship information of the second control channel resource and index information of the second control channel resource but does not carry information of a control channel resource group comprised in the first information, and the first control signaling is used for indicating the spatial relationship information of the plurality of control channel resources; and in response to the plurality of control channel resources being uplink control channel resources, the first control channel resource is a first uplink control channel resource and the second control channel resource is a second uplink control channel resource;

wherein the second control channel resource is a control channel resource satisfying a predetermined characteristic among control channel resources which have same first information.

9. The method of claim 1, wherein the first signaling does not carry the spatial relationship information of the first control channel resource.

10. The apparatus of claim 6, wherein the first signaling does not carry the spatial relationship information of the first control channel resource.

11. The apparatus of claim 6, wherein the processor determines the spatial relationship information of the plurality of control channel resources by:

determining the spatial relationship information of the plurality of control channel resources corresponding to first information as the spatial relationship information of the second control channel resource.

12. The apparatus of claim 11, wherein the plurality of control channel resources corresponding to the first information comprise one of:

at least one control channel resource which has same first information; or at least one control channel resource in a first control channel resource set corresponding to the first information.

13. The apparatus of claim 6, wherein the control channel resource group satisfies following characteristic:

the control channel resource group is acquired by grouping control channel resources in the first control channel resource set according to second control signaling, wherein the second control signaling is radio resource control (RRC) signaling and is used to notify control channel resources comprised in the control channel resource group.

14. The apparatus of claim 12, wherein the first control channel resource set comprises:

a control channel resource in P frequency domain bandwidths;

wherein P is a positive integer greater than 1, and each of P frequency domain bandwidths is a component carrier (CC) or a bandwidth part (BWP);

wherein in response to the at least one control channel resource being a downlink control channel resource, the first control channel resource is a first downlink control channel resource and the second control channel resource is a second downlink control channel resource, the first information comprises index information of the second control channel resource in a second control channel resource set.

* * * * *